(12) United States Patent
Ha et al.

(10) Patent No.: US 10,505,755 B2
(45) Date of Patent: Dec. 10, 2019

(54) SERVER AND METHOD OF MANAGING GROUP ACTIONS OF EXTERNAL APPARATUSES

(71) Applicant: Samsung Electronics Co., Ltd., Suwon-si, Gyeonggi-do (KR)

(72) Inventors: Ji-hun Ha, Seoul (KR); Moon-ki Hong, Yongin-si (KR); Jae-keun Lee, Seoul (KR); Jun-ho Lee, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 15/098,911

(22) Filed: Apr. 14, 2016

(65) Prior Publication Data
US 2016/0315996 A1 Oct. 27, 2016

(30) Foreign Application Priority Data

Apr. 21, 2015 (KR) .................. 10-2015-0056173

(51) Int. Cl.
*H04L 12/28* (2006.01)
*G06F 3/0488* (2013.01)
*G06F 3/038* (2013.01)
*G06F 3/0484* (2013.01)
*H04L 29/08* (2006.01)

(52) U.S. Cl.
CPC .......... *H04L 12/2821* (2013.01); *G06F 3/038* (2013.01); *G06F 3/0488* (2013.01); *G06F 3/04847* (2013.01); *H04L 12/2816* (2013.01); *G06F 2203/0383* (2013.01); *H04L 67/025* (2013.01)

(58) Field of Classification Search
CPC ... H04L 67/025; H04L 12/2816; G06F 3/038; G06F 3/04847; G06F 3/0488; G06F 2203/0383
See application file for complete search history.

(56) References Cited

U.S. PATENT DOCUMENTS

| 7,627,098 | B2 | 12/2009 | Baik et al. | |
|---|---|---|---|---|
| 2003/0164787 | A1* | 9/2003 | Dresti | G08C 17/00 341/176 |
| 2005/0172015 | A1 | 8/2005 | Rana et al. | |
| 2006/0192855 | A1* | 8/2006 | Harris | G08C 17/02 348/162 |
| 2007/0156695 | A1 | 7/2007 | Lim | |

(Continued)

FOREIGN PATENT DOCUMENTS

| KR | 10-0622303 B1 | 6/2006 |
|---|---|---|
| KR | 10-2013-0037610 A | 4/2013 |
| WO | 2013/093682 A1 | 6/2013 |

*Primary Examiner* — Kieu D Vu
*Assistant Examiner* — Roberto Borja
(74) *Attorney, Agent, or Firm* — Jefferson IP Law, LLP

(57) ABSTRACT

A server and a method of controlling a group action of the server are provided. The server can determine whether a conflict occurs between a first group action that is being executed and a second group action that is requested to be executed and determine at least one conflict solution, and the method controls the execution of the group actions by the server and the determination and communication of the conflict solution. The conflict can be determined by using group action characteristics of the first group action and the second group action.

17 Claims, 17 Drawing Sheets

(56) References Cited

U.S. PATENT DOCUMENTS

| | | | |
|---|---|---|---|
| 2008/0126287 A1* | 5/2008 | Cox | G06N 5/02 |
| | | | 706/48 |
| 2008/0228904 A1* | 9/2008 | Crespo-Dubie | H04L 12/2803 |
| | | | 709/223 |
| 2010/0011027 A1* | 1/2010 | Cox | G06Q 10/00 |
| | | | 707/E17.005 |
| 2011/0157631 A1* | 6/2011 | Tsutsumi | G06F 3/1205 |
| | | | 358/1.15 |
| 2011/0320977 A1 | 12/2011 | Bahn et al. | |
| 2013/0024235 A1* | 1/2013 | Willems | G06Q 10/06 |
| | | | 705/7.23 |
| 2013/0090773 A1 | 4/2013 | Park et al. | |

* cited by examiner

SERVER AND METHOD OF MANAGING GROUP ACTIONS OF EXTERNAL APPARATUSES

CROSS-REFERENCE TO RELATED APPLICATION(S)

This application claims the benefit under 35 U.S.C. § 119(a) of a Korean patent application filed on Apr. 21, 2015 in the Korean Intellectual Property Office and assigned Serial number 10-2015-0056173, the entire disclosure of which is hereby incorporated by reference.

TECHNICAL FIELD

The present disclosure relates to servers and methods of controlling group actions of the servers. More particularly, the present disclosure relates to a server that may generate group action solution information corresponding to a conflict between a first group action that is being executed according to a request of a first electronic apparatus, and a second group action that is requested by a second electronic apparatus to be executed, and a method of controlling group actions of the servers.

BACKGROUND

Electronic apparatuses have been developed to provide more and various services and functions, which can even perform multitasking. Various applications that may be used by electronic apparatuses and servers in an Internet of things (IoT) environment have also been developed.

The term 'IoT environment' refers to an environment where things are connected to the Internet by using various communication technologies. In an IoT environment, things around a user may communicate with one another through the Internet and may communicate even with the user.

In an IoT environment, a plurality of things in a smart space (e.g., a home network) may perform one or more preset group action services. One thing may be used to provide one or more group action services, and one thing may provide services corresponding to one or more group actions.

Requests of a plurality of group action services may be sequentially transmitted to one thing through a plurality of user terminals. When a plurality of group action services are sequentially requested, a conflict may occur between the plurality of group action services. Accordingly, there is a demand for a solution to such conflicts that may occur between a plurality of group action services.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a server and a method of controlling a group action of the server.

In accordance with an aspect of the present disclosure, a method of controlling a group action of a server is provided. The method includes executing, as requested by a first electronic apparatus, a first group action that controls one or more external apparatuses connected to the server, receiving, from a second electronic apparatus, an execution request of a second group action that controls on or more external apparatuses connected to the server, determining a group action conflict between the first group action that is being executed and the second group action that is requested to be executed, generating group action solution information corresponding to the group action conflict between the first group action that is being executed and the second group action that is requested to be executed, and transmitting the group action solution information to the second electronic apparatus, wherein the group action conflict is determined based on external apparatuses that are commonly included in the first group action and the second group action.

In accordance with another aspect of the present disclosure, a server for controlling a group action is provided. The server includes a communicator to connect a first electronic apparatus, a second electronic apparatus, and external apparatuses, and a controller to execute a first group action requested from the first electronic apparatus through the communicator that controls some of the external apparatuses, determine a group action conflict between the first group action that is being executed and a second group action that is requested to be executed, and transmit to the second electronic apparatus through the communicator, group action solution information corresponding to the group action conflict determined in response to an execution request of the second group action received from the second electronic apparatus that controls some of the external apparatuses.

In accordance with another aspect of the present disclosure, a method of controlling a group action of an electronic apparatus is provided. The method includes executing an application that controls external apparatuses in the electronic apparatus, the electronic being connectable to the external apparatuses and a server, requesting the server to execute a first group action that changes states of some of the external apparatuses selected in a group action list, receiving, from the server, group action conflict solution information corresponding to a conflict between the first group action and a second group action that is requested to be executed by another electronic apparatus, and displaying the received group action conflict solution information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
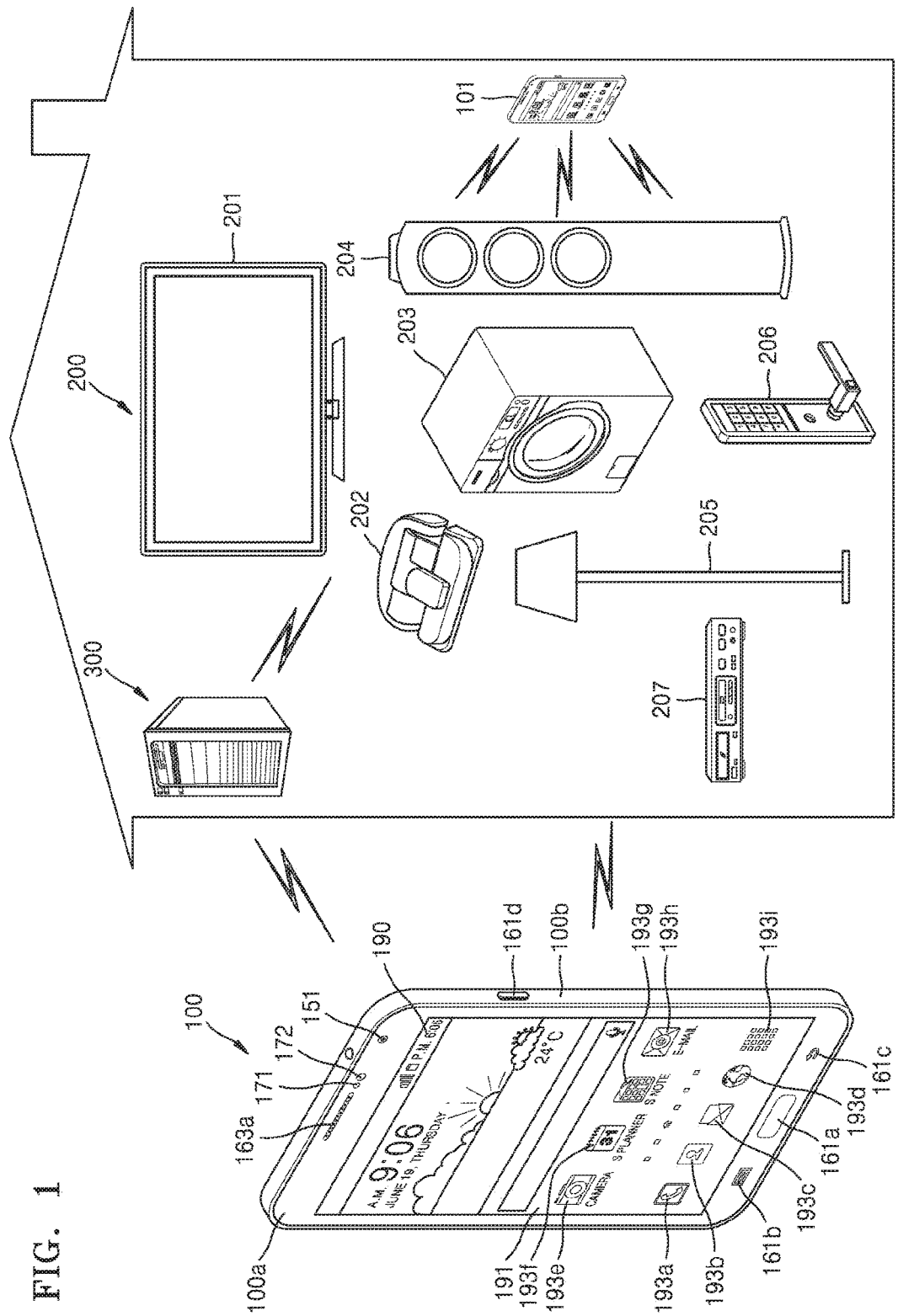
FIG. 1 is a view for illustrating a connection between first and second electronic apparatuses, an external apparatus, and a server according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, t descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

It will be understood that, although the terms first, second, and so forth, may be used herein to describe various elements, these elements should not be limited by these terms. These terms are only used to distinguish one element from another. For example, a first element could be termed a second element, and similarly, a second element could be termed a first element, without departing from the scope of embodiments. As used herein, the term "and/or" includes any and all combinations of one or more of the associated listed items.

The term "application" refers to software that is executed on an operating system (OS) for a computer or a mobile OS and is used by a user. Examples of an application may include a word processor, spread sheet, contacts application, calendar application, memo application, alarm application, social network system (SNS) application, chatting application, map application, music player, and video player. The term "application" according to an embodiment may also refer to software that is executed on an electronic apparatus or an external device (e.g., a server) that is wirelessly or wiredly connected to the electronic apparatus. The term "application" according to an embodiment may still further refer to software that is executed on an electronic apparatus in response to a received user input.

A state of an external apparatus according to an embodiment may refer to context of the external apparatus. State information corresponding to a state of the external apparatus may refer to context information of the external apparatus. A state change of the external apparatus may be the same as a context change of the external apparatus.

According to embodiments of the present disclosure, content may be displayed by an executed application. Examples of content may include a video file or an audio file that is played in a video player that is an application, a music file that is played in a music player, a photo file that is displayed on a photo gallery, and a web page file that is displayed on a web browser. Examples of content may include a video file, audio file, text file, image file, and web page that are displayed or executed by an application. The term "video" used herein may be interchangeably used with a moving image. Examples of content may also include a video file, audio file, text file, image file, and web page that are executed in response to a received user input (e.g., a touch).

Examples of content also include an application screen of an application that is executed, and a user interface included in the application screen. In each case, content may include one or a plurality of pieces of content.

The term "widget" refers to a mini application that is a type of graphical user interface (GUI) that allows a user to more efficiently interact with an application or an OS. Examples of a widget include a weather widget, calculator widget, and clock widget, but embodiments are not limited thereto.

The term "group action" used herein may refer to a set of actions of one or more external apparatuses, and at least one action included in a group action may include an action (e.g., a control command) for changing a state of a corresponding external apparatus. When a group action is generated, group action information corresponding to the group action may be generated and stored. The group action information may include information about whether to perform preset operations (e.g., an operation of changing states) of external apparatuses according to preset context. For example, the group action information may include, but is not limited to, a group action name, external apparatus identifier (ID), external apparatus name, state change information (e.g., On<->Off) of an external apparatus, or state change condition information (e.g., a limit time of 5 minutes) of an external apparatus. The group action information may also include a control command for controlling an operation of an external apparatus. For example, the group action information may include a control command for changing a state of an external apparatus.

The terminology used herein is for the purpose of describing various embodiments only, and is not intended to be limiting of embodiments. It will be further understood that the terms "comprises" and/or "comprising" used herein specify the presence of stated features, integers, operations, members, components, and/or groups thereof, but do not preclude the presence or addition of one or more other features, integers, operations, members, components, and/or groups thereof. In the drawings, the same reference numerals denote the same members that perform substantially the same functions.

FIG. 1 is a view for illustrating a connection between first and second electronic apparatuses, an external apparatus, and a server according to an embodiment of the present disclosure.

Referring to FIG. 1, a first electronic apparatus 100, a second electronic apparatus 101, a server 300, and an external apparatus 200 may be wirelessly connected to one another by using a communicator thereof. For example, the first electronic apparatus 100, the second electronic apparatus 101, the server 300, and the external apparatus 200 may be connected in an ad-hoc mode or an infrastructure mode in which the first electronic apparatus 100, the second electronic apparatus 101, the server 300, and the external apparatus 200 are wirelessly connected to one another through an access point (AP). The first electronic apparatus 100, the second electronic apparatus 101, and the external apparatus 200 may be wirelessly connected to the server 300. Also, the first electronic apparatus 100 and the second electronic apparatus 101 may be directly wirelessly connected to the external apparatus 200. The external apparatus 200 can include one or more of a display apparatus 201, a robot cleaner 202, a washing machine 203, an air conditioner 204, a lamp 205, an auto door lock 206, and a digital versatile disk (DVD) player 207.

The first electronic apparatus 100 may be connected to the external apparatus 200 in a room through the server 300 or directly wirelessly. The second electronic apparatus 101 may be connected to the external apparatus 200 in the room through the server 300 or directly wirelessly. The server 300 may be located in the room or outside (e.g., cloud) the room.

Examples of wireless communication may include, but are not limited to, wireless local area network (LAN) (e.g., Wi-Fi), Bluetooth, Bluetooth low energy (BLE), zigbee, Wi-Fi direction (WFD), ultra-wideband (UWB), infrared data association (IrDA), and near field communication (NFC). Also, the first electronic apparatus 100, the second electronic apparatus 101, the server 300, and the external apparatus 200 may be wiredly connected through a connector.

The first electronic apparatus 100 may receive, through the server 300, state change information corresponding to a state change (e.g., power on/off or a channel change) of the display apparatus 201 that is one external apparatus 200, through an application. Alternatively, the first electronic apparatus 100 may directly receive, from the display apparatus 201, state change information corresponding to a state change (e.g., power on/off or a channel change) of the display apparatus 201 through an application.

The first electronic apparatus 100 may change a state (e.g., may turn on power) of the display apparatus 201 through the server 300 and an application. Alternatively, the first electronic apparatus 100 may directly change a state (e.g., may turn on power) of the display apparatus 201 through an application.

Although the first electronic apparatus 100, the second electronic apparatus 101, the server 300, and the external apparatus 200 are directly connected in FIG. 1, each apparatus may be connected through a sharer, router, or wireless Internet network.

Figure 2A:
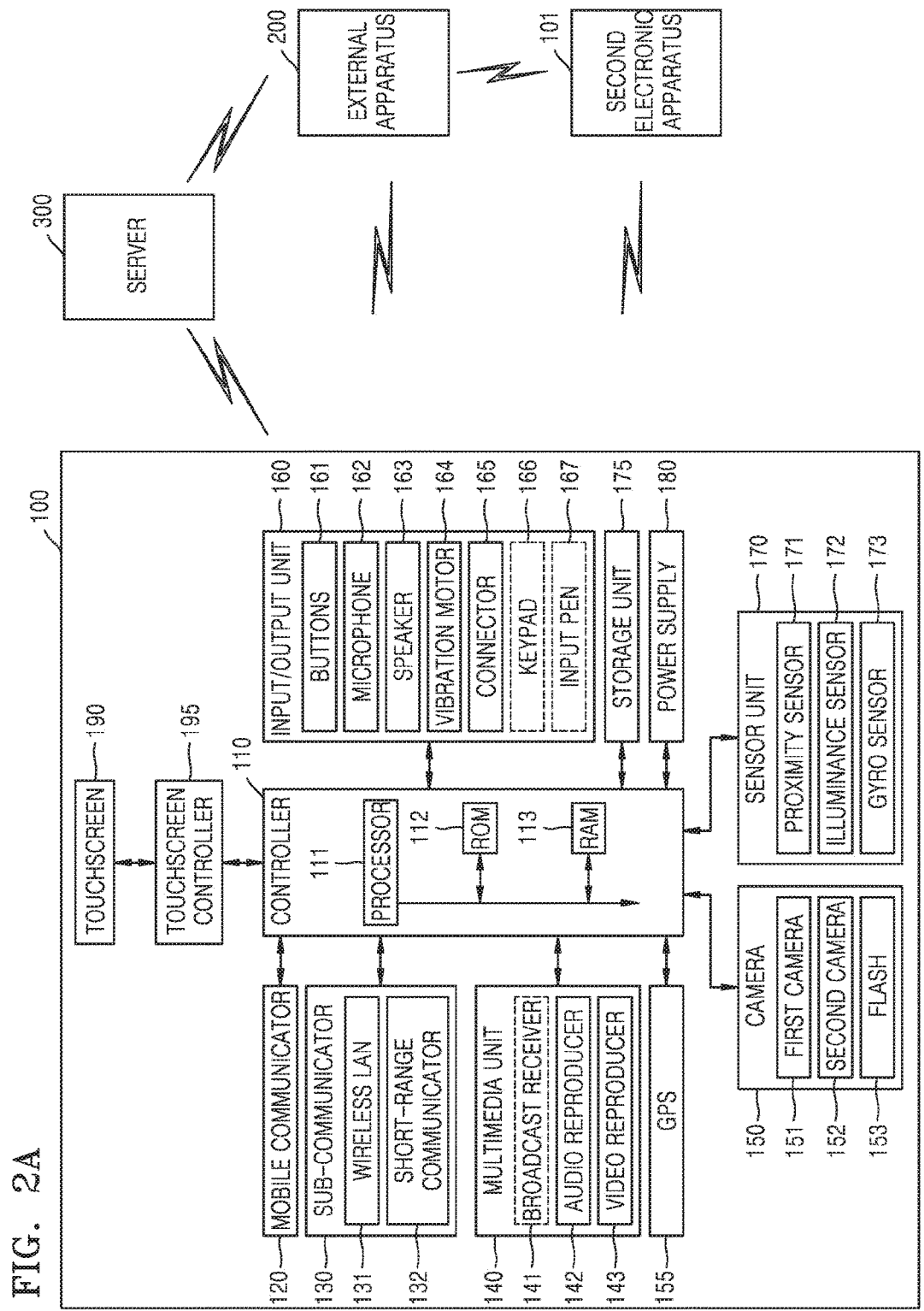
FIG. 2A is a block diagram of a first electronic apparatus according to an embodiment of the present disclosure.

FIG. 2A is a block diagram of a first electronic apparatus according to an embodiment of the present disclosure.

Referring to FIG. 2A, a first electronic apparatus 100 may be wiredly or wirelessly connected to another apparatus (e.g., the external apparatus 200 or the server 300) by using a mobile communicator 120, a sub-communicator 130, and a connector 165. Examples of the first electronic apparatus 100 may include a mobile phone, smart phone, Moving Picture Experts Group phase 1 or phase 2 (MPEG-1 or MPEG-2) audio layer 3 (MP3) player, video player, tablet personal computer (PC), wearable apparatus that may be worn on a body, electronic board, and the display apparatus 201. Examples of the display apparatus 201 may include, but are not limited to, an analog television (TV), digital TV, three-dimensional (3D)-TV, smart TV, light-emitting diode (LED) TV, organic LED (OLED) TV, plasma TV, monitor, curved TV having a screen with a fixed curvature, flexible TV having a screen with a fixed curvature, bended TV having a screen with a fixed curvature, and a variable TV having a screen whose curvature may vary according to a received user input.

The first electronic apparatus 100 may include a touchscreen and may transmit or receive data (or content) to or from the outside through the mobile communicator 120 or the sub-communicator 130. The first electronic apparatus 100 may include an input pen and a touchscreen, and may transmit or receive data (or content) to or from the outside through the mobile communicator 120 or the sub-communicator 130. The first electronic apparatus 100 may also transmit or receive data (or content) to or from an external apparatus via an interaction (e.g., a touch or touch gesture) that is input to a touchscreen 190. The first electronic apparatus 100 may also include a display unit (including only a display panel without a touch panel, not shown) and may transmit or receive data (or content) to or from the outside through the mobile communicator 120 or the sub-communicator 130. The first electronic apparatus 100 may also include one or more touchscreens 190. In this case, the first electronic apparatus 100 may include a plurality of touchscreens that are separated to respectively correspond to the touchscreens.

The first electronic apparatus 100 includes a controller 110, the mobile communicator 120, the sub-communicator 130, a multimedia unit 140, a camera 150, a global positioning system (GPS) 155, an input/output unit 160, a sensor unit 170, a storage unit 175, and a power supply 180. The first electronic apparatus 100 further includes the touchscreen 190 and a touchscreen controller 195.

The controller 110 may include a processor 111, a read-only memory (ROM) 112 in which a control program for controlling the first electronic apparatus 100 is stored, and a random-access memory (RAM) 113 in which a signal or data input from the outside of the first electronic apparatus 100 is stored, or data for various operations performed by the first electronic apparatus 100 is stored.

The controller 110 controls an overall operation of the first electronic apparatus 100 and the flow of signals between the elements 120 through 195 of the first electronic apparatus 100, and processes data. The controller 110 also controls the power supply 180 to supply power to the elements 120 through 195. When there is a user's input or preset conditions are satisfied, the controller 110 may also execute a sensor of the sensor unit 170, an application, or an OS stored in the storage unit 175.

The processor 111 may include a graphics processing unit (GPU, not shown) for graphic processing. The processor 111 may be provided as a system-on-chip (SoC) including a core (not shown) and a GPU (not shown). The processor 111 may include a single core, dual core, triple core, quad core, and multiple core thereof. Also, the processor 111, the ROM 112, and the RAM 113 may be connected to one another via a bus.

The controller 110 may control the mobile communicator 120, the sub-communicator 130, the multimedia unit 140, the camera 150, the GPS 155, the input/output unit 160, the sensor unit 170, the storage unit 175, the power supply 180, the touchscreen 190, and the touchscreen controller 195.

The controller 110 according to an embodiment executes an application that controls external apparatuses in an electronic apparatus that may connect the external apparatuses and a server, requests the server to execute a first group action for changing states of some of the external apparatuses selected in a group action list, receives group action conflict information corresponding to a conflict between the first group action and a second group action requested by another electronic apparatus from the server, and displays the received group action conflict information.

The controller 110 may control a name of an external apparatus that is commonly included in the first group action and the second group action to be displayed on the group action conflict information.

The controller 110 may control group action solution information corresponding to a conflict of the first group action received from the server 300 to be displayed.

The controller 110 may control a name of an external apparatus that is commonly included in the first group action and the second group action to be displayed on the group action solution information.

The controller 110 may control the group action solution information and the group action conflict information to be displayed together.

The controller 110 may control any one of an alarm setting and a recommended group action corresponding to a conflict of the second group action included in the group action solution information to be displayed.

The controller 110 may control the first electronic apparatus 100 to provide feedback corresponding to a group action. For example, the controller 110 may control at least one feedback of a visual feedback, an auditory feedback, and a tactile feedback to be provided in response to generation of a group action, execution of a group action, reception of group action conflict information, reception of group action solution information, or reception of a recommended group action.

The controller 110 may control a control packet corresponding to execution of the first group action to be transmitted to the server 300.

The term "controller" used herein includes the processor 111, the ROM 112, and the RAM 113.

The mobile communicator 120 may be connected to another apparatus (e.g., the external apparatus 200 or the server 300) through a mobile communication network by using one or more antennas under the control of the controller 110. The mobile communicator 120 may transmit/receive a voice call, video call, short message service (SMS), multimedia message (MIMS), and wireless signal for data communication with a mobile phone (not shown) having an available phone number, smart phone (not shown), tablet PC, or another electronic apparatus (not shown).

The sub-communicator 130 may be connected to another apparatus (e.g., the external apparatus 200 or the server 300) through a wireless LAN 131 or a short-range communicator 132 under the control of the controller 110. The sub-communicator 130 may include at least one of the wireless LAN 131 and the short-range communicator 132 (e.g., one of the wireless LAN 131 and the short-range communicator 132 or both the wireless LAN 131 and the short-range communicator 132).

The wireless LAN 131 may be wirelessly connected to an AP in a place where the AP is provided under the control of the controller 110. The wireless LAN 131 may include, for example, Wi-Fi. The wireless LAN 131 supports the IEEE802.11x wireless LAN standard of the institute of electrical and electronics engineers (IEEE). The short-range communicator 132 may wirelessly perform short-range communication between the first electronic apparatus 100 and an external apparatus without an AP under the control of the controller 110. Examples of short-range communication may include Bluetooth, BLE, IrDA, UWB, and NFC.

The first electronic apparatus 100 may include at least one of the mobile communicator 120, the wireless LAN 131, and the short-range communicator 132 according to the desired performance. For example, the first electronic apparatus 100 may include one of the mobile communicator 120, the wireless LAN 131, and the short-range communicator 132, or a combination of the mobile communicator 120, the wireless LAN 131, and the short-range communicator 132. The first electronic apparatus 100 may connect to an external accessory (e.g., a wireless speaker or wireless headset) by using one of the mobile communicator 120 and the sub-communicator 130.

The term "communicator" used herein includes the mobile communicator 120 and the sub-communicator 130.

The multimedia unit 140 may receive an external broadcast program and may reproduce an audio and/or a video under the control of the controller 110. The multimedia unit 140 may include a broadcast receiver 141, an audio reproducer 142, or a video reproducer 143.

The broadcast receiver 141 may receive a broadcast signal (e.g., a TV broadcast signal, radio broadcast signal, or data broadcast signal) that is transmitted from an external broadcasting station and broadcast additional information (e.g., an electronic program guide (EPS) or an electronic service guide (ESG)) through an antenna (not shown) under the control of the controller 110. The controller 110 may also reproduce the received broadcast signal and the received broadcast additional information by using the touchscreen 190, a video codec (not shown), and an audio codec (not shown).

The audio reproducer 142 may reproduce, by using an audio codec, an audio source (e.g., an audio file having a file extension mp3, wma, ogg, or way) that is previously stored in the storage unit 175 of the first electronic apparatus 100 or that is received from the outside under the control of the controller 110.

The audio reproducer 142 according to an embodiment may reproduce an auditory feedback corresponding to a group action. For example, the audio reproducer 142 may reproduce, by using an audio codec, an auditory feedback (e.g., an output of an audio source stored in the storage unit 175) in response to generation of a group action, execution of a group action, reception of group action conflict information, reception of group action solution information, or reception of a recommended group action under the control of the controller 110.

The audio reproducer 142 according to an embodiment may reproduce, by using an audio codec, an auditory feedback (e.g., an output of an audio source stored in the storage unit 175) in response to a touch or a continuous movement of a touch detected by the touchscreen 190 under the control of the controller 110.

The video reproducer 143 may reproduce, by using a video codec, a digital video source (e.g., a video file having a file extension mpeg, mpg, mp4, avi, mov, or mkv) that is previously stored in the storage unit 175 of the first electronic apparatus 100 or that is received from the outside under the control of the controller 110.

A multimedia application that may be installed in the first electronic apparatus 100 may reproduce an audio source or a video source by using an audio codec and/or a video codec. Alternatively, a multimedia application that may be installed in the first electronic apparatus 100 may reproduce a video source by using a hardware codec (not shown) and/or a software codec (not shown).

The video reproducer 143 according to an embodiment may reproduce a visual feedback related to a group action. For example, the video reproducer 143 may reproduce, by using a video codec, a visual feedback (e.g., an output of a video source stored in the storage unit) in response to generation of a group action, execution of a group action, reception of group action conflict information, reception of group action solution information, or reception of a recommended group action under the control of the controller 110.

It will be understood by one of ordinary skill in the art that various video codecs and audio codecs that may reproduce audio/video files having various file extensions are produced and sold. Accordingly, detailed descriptions thereof are omitted.

The multimedia unit 140 may include the audio reproducer 142 and the video reproducer 143 without the broadcast receiver 141, according to the desired performance or structure of the first electronic apparatus 100. The controller 110 may also include the audio reproducer 142 or the video reproducer 143 of the multimedia unit 140.

The term "audio codec" used herein may include one or more audio codecs. The term "video codec" used herein may include one or more video codecs.

Referring to FIGS. 1 and 2A, the camera 150 may capture a still image or a moving image under the control of the controller 110. The camera 150 may include at least one of the first camera 151 on a front surface 100*a* and a second camera 152 on a rear surface (not shown). For example, the camera 150 may include one of the first camera 151 and the second camera 152, or may include both the first camera 151 and the second camera 152. The first camera 151 or the second camera 152 may also include an auxiliary light source (e.g., a flash 153) that provides a sufficient amount of light to capture an image.

The controller 110 may capture a 3D still image or a 3D moving image by using the first camera 151 on the front surface 100*a* and an additional camera (e.g., a third camera (not shown)) located adjacent to the first camera 151 to be spaced by an interval that is, for example, greater than 30 mm and less than 80 mm, from the first camera 151. The controller 110 may also capture a 3D still image or a 3D moving image by using the second camera 152 on the rear surface and an additional camera (e.g., a fourth camera (not shown)) located adjacent to the second camera 152 to be spaced by an interval that is, for example, greater than 30 mm and less than 80 mm, from the second camera 152. The first and second cameras 151 and 152 may also perform wide-angle imaging, telephoto imaging, and close-up imaging by using an additional lens (not shown) attachable/detachable to/from a separate adaptor (not shown).

The GPS 155 periodically receives, from a plurality of GPS satellites (not shown) in the earth's orbit, orbit signals (e.g., orbit information of the GPS satellites, time information of the GPS satellites, and navigation messages). Accordingly, the first electronic apparatus 100 that is located outdoors may calculate locations of the first electronic apparatus 100 and the plurality of GPS satellites (not shown) by using the signals received from the plurality of GPS satellites, and may calculate distances by using transmission/reception time differences. A location, time, or movement speed of the first electronic apparatus 100 may also be calculated by using triangulation or similar methods. An additional GPS satellite may be needed to correct an orbit or a time. Even when the first electronic apparatus 100 is located indoors, the first electronic apparatus 100 may be able to calculate a location, time, or movement speed of the first electronic apparatus 100 that is located indoors by using signals received through the GPS 155 from a plurality of GPS satellites (not shown).

The first electronic apparatus 100 may also detect a location or movement speed of the first electronic apparatus 100 that is located indoors by using a wireless AP. The first electronic apparatus 100 may detect a location of the first electronic apparatus 100 that is located indoors by using a cell-ID method using an ID of a wireless AP, an enhanced cell-ID method using a received signal strength (RSS) and an ID of a wireless AP, or an angle of arrival (AoA) method using an angle at which a signal transmitted from an AP is received by the first electronic apparatus 100.

Alternatively, the first electronic apparatus 100 may detect a location or movement speed of the first electronic apparatus 100 that is located indoors by using a wireless beacon (not shown). It will be understood by one of ordinary skill in the art that a location of the first electronic apparatus 100 that is located indoors may also be detected by using any of various other methods.

The input/output unit 160 may include at least one of one or more buttons 161, a microphone 162, a speaker 163, a vibration motor 164, the connector 165, a keypad 166, and an input pen 167.

Referring to FIG. 1, the buttons 161 include a home button 161*a*, a menu button 161*b*, and a back button 161*c* that are disposed on a lower portion of the front surface 100*a*. The buttons 161 may also include a power/lock button 161*d* located on a side surface 100*b*. Alternatively, the buttons 161 of the first electronic apparatus 100 may include only the home button 161*a*, and the power/lock button 161*d*. The buttons 161 of the first electronic apparatus 100 may be physical buttons, or touch buttons located in a bezel outside the touchscreen 190. Alternatively, the buttons 161 of the first electronic apparatus 100 may be displayed as text, images, or icons on the touchscreen 190.

The microphone 162 receives a voice or a sound from the outside and generates an electrical signal under the control of the controller 110. The electrical signal generated by the microphone 162 may be converted by an audio codec and may be stored in the storage unit 175 or output through the speaker 163. One or more microphones 162 may be located on the front surface 100*a*, the side surface 100*b*, and the rear surface of the first electronic apparatus 100. Alternatively, one or more microphones 162 may be located only on the side surface 100*b* of the first electronic apparatus 100.

The speaker 163 may output a sound corresponding to any of various signals (e.g., a wireless signal, broadcast signal, audio source, video file, or imaging signal) of the mobile communicator 120, the sub-communicator 130, the multimedia unit 140, and the camera 150 to the outside by using an audio codec under the control of the controller 110.

The speaker 163 may also output a sound (e.g., a touch sound corresponding to a phone number input or an imaging button pressure sound) corresponding to a function performed by the first electronic apparatus 100. One or more speakers 163 may be located on the front surface 100*a*, the side surface 100*b*, and the rear surface of the first electronic apparatus 100. Referring to FIGS. 1 and 2A, a plurality of speakers 163 may be located on the front surface 100*a* of the first electronic apparatus 100. Alternatively, the speakers 163 may be respectively located on the front surface 100a and the rear surface of the first electronic apparatus 100. One speaker 163a may be located on the front surface 100a of the first electronic apparatus 100 and a plurality of speakers (e.g., speakers 163a and an additional speaker (not shown)) may be located on the rear surface of the first electronic apparatus 100. Alternatively a plurality of speakers (not shown) may be located on the side surface 100b. The first electronic apparatus 100 including an additional speaker (not shown) that is located on the side surface 100b may provide a sound effect to a user that is different from that of another electronic apparatus (not shown) including speakers located on the front surface 100a and the rear surface. A proximity sensor 171, an illuminance sensor 172, and a first camera 151 may also be located on the front surface 100a of the first electronic apparatus 100.

The speaker 163 according to an embodiment may output an auditory feedback corresponding to a group action. For example, the speaker 163 may output an auditory feedback in response to generation of a group action, execution of a group action, reception of group action conflict information, reception of group action solution information, or reception of a recommended group action under the control of the controller 110.

The vibration motor 164 may convert an electrical signal into a mechanical vibration under the control of the controller 110. Examples of the vibration motor 164 may include a linear vibration motor, bar-type vibration motor, coin-type vibration motor, and piezoelectric vibration motor. For example, when a voice call request is received from another electronic apparatus (not shown), the vibration motor 164 of the first electronic apparatus 100 may operate in a vibration mode under the control of the controller 110. The first electronic apparatus 100 may include one or more vibration motors 164. Also, the vibration motor 164 may vibrate the entire first electronic apparatus 100 or only a part thereof.

The vibration motor 164 according to an embodiment may also output a tactile feedback corresponding to a group action. For example, the vibration motor 164 may output a tactile feedback in response to generation of a group action, execution of a group action, reception of group action conflict information, reception of group action solution information, or reception of a recommended group action under the control of the controller 110. The vibration motor 164 may also provide various tactile feedbacks (e.g., an intensity of a vibration and a duration of the vibration) that are received from the outside or are previously stored based on a control command of the controller 110.

The connector 165 may be used as an interface for connecting the first electronic apparatus 100 and an external apparatus (not shown) or a power source (not shown). The first electronic apparatus 100 may transmit data stored in the storage unit 175 to an external apparatus (not shown) or may receive data from an external apparatus (not shown) through a wired cable connected to the connector 165 under the control of the controller 110. The first electronic apparatus 100 may also receive power from a power source (not shown) or may charge a battery (not shown) through a wired cable connected to the connector 165. The first electronic apparatus 100 may also connect to an external accessory (e.g., a speaker (not shown) or a keyboard dock (not shown)) through the connector 165.

The keypad 166 may receive a key input from a user in order to control the first electronic apparatus 100. Examples of the keypad 166 include a physical keypad (not shown) formed on the front surface 100a of the first electronic apparatus 100, a virtual keypad (not shown) displayed on the touchscreen 190, and a physical keypad (not shown) that may be wirelessly or wiredly connected. It will be understood by one of ordinary skill in the art that the physical keypad (not shown) formed on the front surface 100a of the first electronic apparatus 100 may be omitted according to the desired performance or structure of the first electronic apparatus 100.

The input pen 167 may touch or select an object (e.g., a menu, text, image, video, figure, icon, or shortcut icon) displayed (configured) on a home screen 191 of the touchscreen 190 of the first electronic apparatus 100, or on a screen (e.g., a memo screen, notepad screen or calendar screen) displayed on a handwriting/drawing application. The input pen 167 may also touch or select content (e.g., a text file, image file, audio file, video file, or web page) displayed on the touchscreen 190 of the first electronic apparatus 100 or a screen (e.g., a memo screen, note screen, or calendar screen) displayed on a handwriting/drawing application. Alternatively, the input pen 167 may perform handwriting or drawing (e.g., painting or sketching) on a screen (e.g., a canvas screen) of a drawing application or a screen (e.g., a memo screen) of a handwriting application displayed on the touchscreen 190 of the first electronic apparatus 100.

The input pen 167 may input letters and so forth by touching the touchscreen 190 using a capacitive method, resistive method, or electromagnetic resonance (EMR) method, or by using a displayed virtual keypad. Examples of the input pen 167 may include a stylus pen and a haptic pen (not shown) in which a vibration device (e.g., an actuator or a vibration motor) is provided and vibrates. The input pen 167 may also operate (e.g., vibrate) the vibration device in response to not only control information received from the first electronic apparatus 100, but also sensing information detected by a sensor (e.g., an acceleration sensor, not shown) that is provided in the input pen 167.

When the input pen 167 is taken out from an insertion hole (not shown), the controller 110 may execute a handwriting/drawing application and may display a screen (not shown) of the handwriting/drawing application on the touchscreen 190.

Other examples of the input pen 167 may include the user's finger (e.g., the thumb). For example, handwriting or drawing may be performed by using the user's finger through an application that is displayed on the touchscreen 190 using a capacitive method or a resistive method.

When handwriting or drawing is performed by using the user's finger through an application that is displayed on the touchscreen 190 using a capacitive method or a resistive method, the controller 110 may detect a touch of one of the user's fingers including the thumb by using the touchscreen 190 and the touchscreen controller 195.

It will be understood by one of ordinary skill in the art that a shape (e.g., a circular cross-sectional shape or a polygonal cross-sectional shape) and/or a structure (e.g., the existence of a battery (not shown)) of the input pen 167 corresponding to the insertion hole of the first electronic apparatus 100 may vary according to the desired performance or structure of the first electronic apparatus 100.

The sensor unit 170 includes at least one sensor that detects a state of the first electronic apparatus 100. For example, the sensor unit 170 may include the proximity sensor 171 that detects whether the user or other element approaches the first electronic apparatus 100, the illuminance sensor 172 that detects the amount of light around the first electronic apparatus 100, and a gyro sensor 173 that detects a device direction and orientation by using the rotational inertia of the first electronic apparatus 100. The sensor unit 170 may also include an acceleration sensor (not shown) that detects acceleration applied in up to three axes (e.g., x, y, and z-axes) to the first electronic apparatus 100, a gravity sensor that detects a direction in which gravity is applied, or an altimeter that detects a height by measuring an atmospheric pressure.

The sensor unit 170 may measure acceleration due to motion and acceleration due to gravity of the first electronic apparatus 100. When the first electronic apparatus 100 does not move, the sensor unit 170 may measure only acceleration due to gravity. The sensor unit 170 may further include a fingerprint sensor (not shown) that detects the user's fingerprint or a heart rate sensor (not shown) that detects the user's heart rate.

At least one sensor included in the sensor unit 170 detects a state of the first electronic apparatus 100, generates an electrical signal corresponding to the detected state, and transmits the electrical signal to the controller 110. It will be understood by one of one of ordinary skill in the art that at least one sensor may be added to or deleted from the sensor unit 170 according to the desired performance of the first electronic apparatus 100.

The storage unit 175 may store signals or data that are input/output in response to operations of the mobile communicator 120, the sub-communicator 130, the multimedia unit 140, the camera 150, the GPS unit 155, the input/output unit 160, the sensor unit 170, and the touchscreen 190 under the control of the controller 110. The storage unit 175 may store a GUI related to both an application that is provided by a manufacturer or uploaded from the outside and a control program for controlling the first electronic apparatus 100 or the controller 110, images for providing the GUI, user information, documents, databases, or related data.

The storage unit 175 according to an embodiment may store apparatus information of the first electronic apparatus 100, apparatus information of the external apparatus 200, or apparatus information of the server 300.

The storage unit 175 may store external apparatus state information, a group action list, group action conflict information, group action solution information, a recommended group action, or alarm setting information that are received from the server 300.

The storage unit 175 may store a control packet corresponding to a first group action.

The storage unit 175 may store first through seventh touches, first through seventh touch positions, or first through seventh touch position information.

The storage unit 175 may store a visual feedback (e.g., a video source) that is output to the touchscreen 190 and may be perceived by the user, an auditory feedback (e.g., a sound source) that is output from the speaker 163 and may be perceived by the user, and a tactile feedback (e.g., a haptic pattern) that is output from the vibration motor 164 and may be perceived by the user, in response to generation of a group action, execution of a group action, reception of group action conflict information, reception of group action solution information, or reception of a recommended group action.

The storage unit 175 may store a feedback time (e.g., 300 msec) for which a feedback is provided to the user.

The term "storage unit" according to an embodiment collectively includes the storage unit 175, and the ROM 112 or the RAM 113 included in the controller 110, or a memory card (not shown, e.g., a micro secure digital (SD) card or a memory stick) provided in the first electronic apparatus 100. Examples of the storage unit may include a nonvolatile memory, volatile memory, hard disk drive (HDD), and solid-state drive (SSD).

The power supply 180 may supply power to the elements 120 through 195 included in the first electronic apparatus 100 under the control of the controller 110. The power supply 180 may supply to the first electronic apparatus 100, power that is input from an external power source (not shown) through a wired cable (not shown) that is connected to the connector 165 under the control of the controller 110. The power supply 180 may also supply power and may charge one or more batteries (not shown) under the control of the controller 110. The one or more batteries may be disposed between a rear surface and the touchscreen 190 that is disposed on the front surface.

The power supply 180 may charge the one or more batteries by using a wireless method (e.g., a magnetic resonance method, electromagnetic radiation method, acoustic resonance method, or magnetic induction method) under the control of the controller 110.

The touchscreen 190 includes a touch panel (not shown) that receives a touch input and a display panel (not shown) that displays an image. The touchscreen 190 may provide a GUI corresponding to any of various services (e.g., a voice call, video call, data transmission, broadcast reception, imaging, video watching, or execution of an application) to the user. The touchscreen 190 transmits an analog signal corresponding to a single touch or a multi-touch that is input through the GUI or the home screen 191 to the touchscreen controller 195. The touchscreen 190 may receive the single touch or the multi-touch through the user's body part (e.g., a finger such as the thumb) or the input pen 167.

The display panel (not shown) includes a plurality of pixels and displays an image through the pixels. Examples of the display panel include a liquid crystal display (LCD), an OLED, and an LED. The display panel may display various images and a plurality of objects according to various operation states of the first electronic apparatus 100 or execution of an application or service.

Examples of a touch according to an embodiment are not limited to contact between the touchscreen 190 and the user's body part or the input pen 167, and also include non-contact gestures. Examples of non-contact gestures may include hovering within an interval of, for example, 50 mm or less between the touchscreen 190 and the user's body part or the input pen 167. It will be understood by one of ordinary skill in the art that a non-contact interval that may be detected by the touchscreen 190 may vary according to the performance or structure of the first electronic apparatus 100.

The touchscreen 190 may use, for example, a resistive method, capacitive method, infrared method, or acoustic wave method.

Alternatively, the touchscreen 190 may use an EMR method. When the touchscreen 190 uses an EMR method, the touchscreen 190 further includes a separate EMR touch panel (not shown) for receiving an input of an input pen (not shown) including a resonance circuit that resonates in an EMR loop coil.

The touchscreen 190 according to an embodiment may display a visual feedback corresponding to a group action. The touchscreen 190 may display a visual feedback in response to generation of a group action, execution of a group action, reception of group action conflict information, reception of group action solution information, or reception of a recommended group action under the control of the controller 110.

The touchscreen controller 195 converts an analog signal corresponding to a single touch or a multi-touch received from the touchscreen 190 into a digital signal and transmits the digital signal to the controller 110. The controller 110 may calculate X and Y (and Z for non-contact gestures) coordinates corresponding to a touch position on the touchscreen 190 by using the digital signal received from the touchscreen controller 195.

The controller 110 may control the touchscreen 190 by using the digital signal received from the touchscreen controller 195. For example, the controller 110 may display, for example, a shortcut icon 193a on the touchscreen 190 so that the shortcut icon 193a is distinguished from other shortcut icons 193b through 193i in response to an input touch, or may execute an application corresponding to the selected shortcut icon 193a and display an application screen on the touchscreen 190.

According to embodiments of the present disclosure, one or more touchscreen controllers 195 may be provided. The touchscreen controller 195 may also be included in the controller 110 according to the desired performance or structure of the first electronic apparatus 100.

When the touchscreen 190 uses an EMR method, the touchscreen controller 195 converts an analog signal corresponding to a touch received from the touchscreen 190 into a digital signal and transmits the digital signal to the controller 110. The controller 110 may calculate X and Y (and Z for non-contact gestures) coordinates corresponding to a touch position on the touchscreen 190 by using the digital signal received from the touchscreen controller 195. Also, when the touchscreen 190 uses an EMR method, a touchscreen controller (not shown) using an EMR method may be used.

Although the first electronic apparatus 100 includes one touchscreen 190 in FIGS. 1 and 2A, the first electronic apparatus 100 may include a plurality of touchscreens 190. The plurality of touchscreens 190 may be respectively located in housings (not shown) and the housings may be connected to one another by using hinges (not shown). Alternatively, a plurality of touchscreens 190 that are flexible may be provided and located in one housing. The plurality of flexible touchscreens 190 may include one display panel and a plurality of touch panels. The plurality of flexible touchscreens 190 may also include one touch panel corresponding to a plurality of display panels. Alternatively, the plurality of flexible touchscreens 190 may include a plurality of touch panels corresponding to a plurality of display panels.

It will be understood by one of ordinary skill in the art that at least one element may be added to or deleted from the elements included in the first electronic apparatus 100 of FIG. 2A according to the desired performance of the first electronic apparatus 100.

Figure 2B:
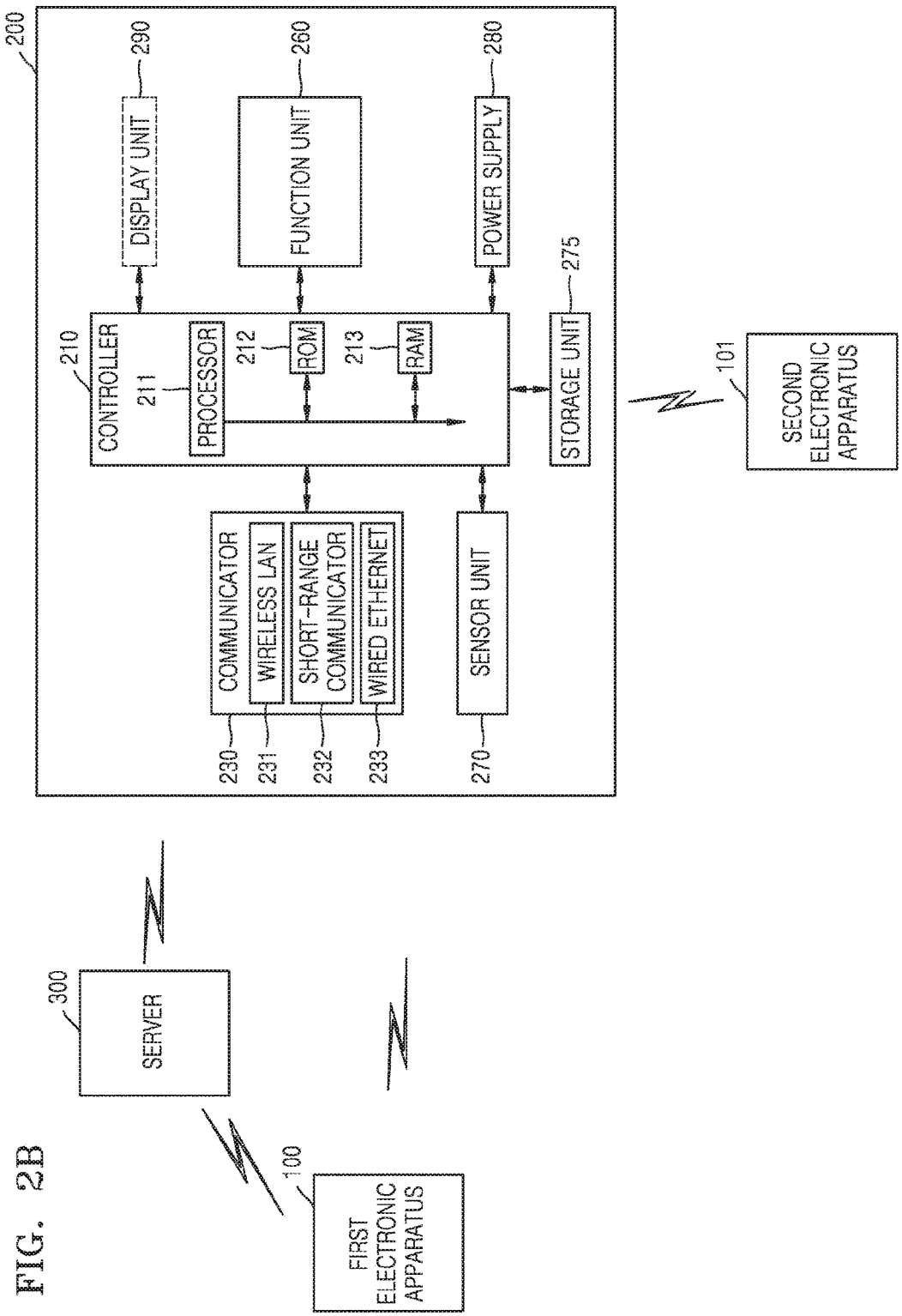
FIG. 2B is a block diagram of an external apparatus according to an embodiment of the present disclosure.

FIG. 2B is a block diagram of an external apparatus according to an embodiment of the present disclosure.

Referring to FIG. 2B, an external apparatus 200 may be wiredly or wirelessly connected to the first or second electronic apparatus 100 or 101, another external apparatus, or the server 300 by using a communicator 230.

Examples of the external apparatus 200 may include the display apparatus 201, the robot cleaner 202, the washing machine 203, the air conditioner 204, the lamp 205, the auto door lock 206, and the digital versatile disk (DVD) player 207, as illustrated in FIG. 1. Examples of the external apparatus 200 may also include a curtain (not shown), a sensor (not shown) including a temperature sensor, a window (not shown), a refrigerator (not shown), an electric fan (not shown), a garage door, a home theater (not shown), a wireless soundbar (not shown), a wireless headset (not shown), a wireless earphone (not shown), a wireless headphone (not shown), a monitor (not shown), a wearable apparatus (not shown), a bookmark (not shown), a mobile phone (not shown), and a smart phone (not shown).

The external apparatus 200 may be connected to the first or second electronic apparatus 100 or 101 or the server 300 through the communicator 230. The external apparatus 200 may detect an internal state or an external state of the external apparatus 200 by using a function unit 260 or a sensor unit 270, and may transmit the detected internal or external state to the first or second electronic apparatus 100 or 101 or the server 300 through the communicator 230. The external apparatus 200 may be any of a set of external apparatuses, e.g., 201 through 206.

Each external apparatus 200 may perform a unique function. Examples of the unique function of the external apparatus 200 may include a broadcast receiving function of the display apparatus 201, an auto cleaning function of the robot cleaner 202, a washing function of the washing machine 203, a cooling function of the air conditioner 204, an illumination function of the lamp 205, a locking function of the auto door lock 206, a refrigerating/freezing function of the refrigerator (not shown), and an audio outputting function of the audio apparatus (not shown). It will be understood by one of ordinary skill in the art that the unique functions of the external apparatus 200 are not limited thereto.

The external apparatus 200 may include a controller 210, the communicator 230, the function unit 260, the sensor unit 270, a storage unit 275, a power supply 280, and a display unit 290.

The controller 210 may include a processor 211 and a ROM 212 in which a control program for controlling the external apparatus 200 is stored, and a RAM 213 in which a signal or data input from the outside of the external apparatus 200 is stored or data for various operations performed by the external apparatus 200 is stored.

The controller 210 controls an overall operation of the external apparatus 200 and the flow of signals between the elements 220 through 290 included in the external apparatus 200, and processes data. The controller 210 controls the power supply 280 to supply power to the elements 220 through 290. When there is a user's input or preset conditions are satisfied, the controller 210 may execute a sensor of the sensor unit 270, or an application or an OS stored in the storage unit 275.

The processor 211 may include a GPU (not shown) for graphic processing. The processor 211 may be provided as an SoC including a core (not shown) and a GPU (not shown). The processor 211 may include a single core, dual core, triple core, quad core, and multiple core thereof. Also, the processor 211, the ROM 212, and the RAM 213 may be connected to one another via a bus.

The controller 210 may control the communicator 230, the function unit 260, the sensor unit 270, the storage unit 275, the power supply 280, and the display unit 290.

The controller 210 may control the sensor unit 270 and a separate sensor (not shown) to detect a state and a state change of the external apparatus 200.

The controller 210 may control changed external apparatus state information to be transmitted to the server 300 by using server apparatus information stored in the storage unit 275 and the communicator 230.

The controller 210 may control a control packet corresponding to a group action that is requested to be executed to be received from the server 300 through the communicator 230.

The controller 210 may control the external apparatus 200 in response to the control packet received from the server 300.

The controller 210 may control a control packet corresponding to execution of a group action, external apparatus state information, or server apparatus information to be stored in the storage unit 275.

The term "controller 210 of the external apparatus" according to an embodiment includes the processor 211, the ROM 212, and the RAM 213.

The controller 210 of the external apparatus 200 according to an embodiment may refer to a controller of each of the external apparatuses 201 through 206.

The external apparatus 200 may include a mobile communicator (not shown).

The mobile communicator of the external apparatus 200 may transmit/receive a voice call, video call, SMS, MMS, and wireless signal for data communication with a mobile phone (not shown) having an available phone number, smart phone (not shown), tablet PC, or another electronic apparatus (not shown).

The communicator 230 may include at least one of a wireless LAN 231, a short-range communicator 232, and a wired Ethernet 233. For example, the communicator 230 may include one of the wireless LAN 231, the short-range communicator 232, and the wired Ethernet 233, or may include a combination of the wireless LAN 231, the short-range communicator 232, and the wired Ethernet 233.

The wireless LAN 231 may be wirelessly connected to an AP in a place where the AP is provided under the control of the controller 210. The wireless LAN 231 may include, for example, Wi-Fi. The wireless LAN 231 supports the IEEE802.11x wireless LAN standard of the IEEE. The short-range communicator 232 may wirelessly perform short-range communication between the first electronic apparatus 100 and the external apparatus 200 without an AP under the control of the controller 210. Examples of short-range communication may include Bluetooth, BLE, IrDA, UWB, and NFC.

The communicator 230 may transmit state information or environment information detected (or stored) by the function unit 260 to the server 300 under the control of the controller 210. The communicator 230 may periodically (e.g., every 1 second that may be changed) or aperiodically transmit state information or environment information detected (or stored) by the function unit 260 to the server 300 under the control of the controller 210. Also, the communicator 230 may receive a request to transmit detected (or stored) state information or environment information from one of the server 300 and the first electronic apparatus 100.

The external apparatus 200 may connect to another external apparatus (e.g., a wireless speaker or wireless headset) through the communicator 230.

The external apparatus 200 may include a front camera (not shown) that captures a still image or a moving image under the control of the controller 210.

The external apparatus 200 may also include a GPS (not shown). The GPS periodically receives information (e.g., accurate location information and time information of a plurality of GPS satellites that may be received by the external apparatus 200) from the plurality of GPS satellites (not shown) in the earth's orbit.

Each function unit 260 may perform a function different from those of other apparatuses. Examples of the function may include a broadcast receiving function of the display apparatus 201, an auto cleaning function of the robot cleaner 202, a washing function of the washing machine 203, a cooling function of the air conditioner 204, an illumination function of the lamp 205, a locking function of the auto door lock 206, a refrigerating/freezing function of the refrigerator (not shown), and an audio outputting function of the audio apparatus (not shown).

When the external apparatus 200 is the display apparatus 201, the function unit 260 may display, on a screen, a video included in a broadcast signal received through a tuner (not shown) and a display panel (not shown) under the control of the controller 210. In this case, the function unit 260 may output an audio included in the received broadcast signal through a speaker (not shown) under the control of the controller 210.

When the external apparatus 200 is the robot cleaner 202, the function unit 260 may capture dust on the floor through a filter (not shown) or a motor (not shown) under the control of the controller 210. In this case, the function unit 260 may include a wheel (not shown) that allows the function unit 260 to drive itself and avoid obstructions.

When the external apparatus 200 is the washing machine 203, the function unit 260 may wash laundry loaded in a tub (not shown) through a motor (not shown), the tub, and a lid under the control of the controller 210. In this case, the function unit 260 may include a vibration reducing member (e.g., a balancer) for reducing vibration of the tub during rotation.

When the external apparatus 200 is the air conditioner 204, the function unit 260 may lower air temperature by using a compressor (not shown), a condenser (not shown), an expansion valve (not shown), and an evaporator (not shown) in a refrigeration cycle under the control of the controller 210. In this case, the function unit 260 may include a coolant (not shown) and a tube (not shown) in which the coolant moves. The same applies when the external apparatus 200 is a refrigerator.

When the external apparatus 200 is the lamp 205, the function unit 260 may turn on/off a bulb secured in a socket or may change a brightness of the bulb under the control of the controller 210.

When the external apparatus 200 is the auto door lock 206, the function unit 260 may selectively lock or unlock a door under the control of the controller 210. In this case, the function unit 260 may output a warning sound through a speaker (not shown) indicating an abnormal situation under the control of the controller 210.

When the external apparatus 200 is a digital versatile disk (DVD) player 207, the function unit 260 may play or stop a DVD under the control of the controller 210. In this case, the function unit 260 may pause the DVD under the control of the controller 210.

When the external apparatus 200 is an audio apparatus (not shown), the function unit 260 may output audio streams received through the communicator 230 under the control of the controller 210. In this case, the function unit 260 may output an audio under the control of the controller 210.

When the external apparatus 200 is a sensor (not shown), the function unit 260 may perform a unique function of the sensor. State information (e.g., power-on, standby, or operation) or environment information (e.g., a temperature, gradient, or movement speed) detected by the function unit 260 may be detected and stored in the storage unit 275. In this case, the sensor (not shown) may transmit the state information or the environment information to the first electronic apparatus 100 through the communicator 230 under the control of the controller 210.

For example, when the function unit 260 is an illuminance sensor, the function unit 260 may detect an illuminance around the function unit 260. When the function unit 260 is a temperature sensor, the function unit 260 may detect a temperature. When the function unit 260 is a humidity sensor, the function unit 260 may detect a humidity around the function unit 260. When the function unit 260 is an acceleration sensor, the function unit 260 may detect an acceleration applied in up to three axes (e.g., x, y, and z-axes). When the function unit 260 is a gyro sensor, the function unit 260 may detect a direction and orientation by using rotational inertia. It will be understood by one of ordinary skill in the art that the function unit 260 is not limited to these example, and may be any of various other sensors or sensor combinations.

The sensor unit 270 may detect an internal state or an external state of the external apparatus 200 under the control of the controller 210. The sensor unit 270 may also detect an internal or external state change of the external apparatus 200 under the control of the controller 210. When the external apparatus 200 is not a sensor, the external apparatus 200 may include both the function unit 260 and the sensor unit 270. Also, when the external apparatus 200 is a sensor, the sensor unit 270 of the external apparatus 200 may be replaced with the function unit 260.

The storage unit 275 may store signals or data that are input/output in response to operations of the communicator 230, the function unit 260, the sensor unit 270, and the display unit 290 under the control of the controller 210. The storage unit 275 may store a GUI related to both an application that is provided by a manufacturer or uploaded from the outside and a control program for controlling the external apparatus 200 or the controller 210, images for providing the GUI, user information, documents, databases, or related data.

The storage unit 275 may store state information (e.g., power-on or operation) or environment information (e.g., a temperature, acceleration, or illuminance) detected by the sensor unit 270 or data related to an operation of the function unit 260 under the control of the controller 210.

The storage unit 275 may also store server apparatus information, external apparatus state information, or a control packet corresponding to execution of a group action.

The power supply 280 may supply power to the elements 230 through 290 included in the external apparatus 200 under the control of the controller 210. The power supply 280 may supply to the external apparatus 200, power that is input from an external power source (not shown) through a wired cable (not shown) that is connected to a connector (not shown) under the control of the controller 210. Also, the power supply 280 may supply power and may charge one or more batteries (not shown) under the control of the controller 210.

The power supply 280 may charge the one or more batteries by using a wireless method (e.g., a magnetic resonance method, electromagnetic radiation method, acoustic resonance method, or magnetic induction method) under the control of the controller 210.

The display unit 290 may provide a GUI corresponding to any of various services (e.g., a voice call, video call, data transmission, broadcast reception, imaging, video watching, or execution of an application) to the user under the control of the controller 210. A display panel (not shown) includes a plurality of pixels and displays an image through the pixels. Examples of the display panel include an LCD, an OLED, and an LED. The display panel may display various images and a plurality of objects according to various operation states of the external apparatus 200 or execution of an application or service.

The display unit 290 may include a touchscreen including a display panel (not shown) and a touch panel (not shown). The touchscreen may use, for example, a resistive method, capacitive method, infrared method, or acoustic wave method.

The display unit 290 according to an embodiment may output a visual feedback in response to execution of a group action under the control of the controller 210.

It will be understood by one of ordinary skill in the art that although the first electronic apparatus 100 and the external apparatus 200 are separate from each other in FIGS. 1, 2A, and 2B, the first electronic apparatus 100 and the external apparatus 200 may be the same type of electronic apparatus (e.g., tablet apparatuses 1 and 2).

It will be understood by one of ordinary skill in the art that at least one element may be added to or deleted from the elements of the external apparatus 200 of FIG. 2B according to the desired performance of the external apparatus 200.

Figure 2C:
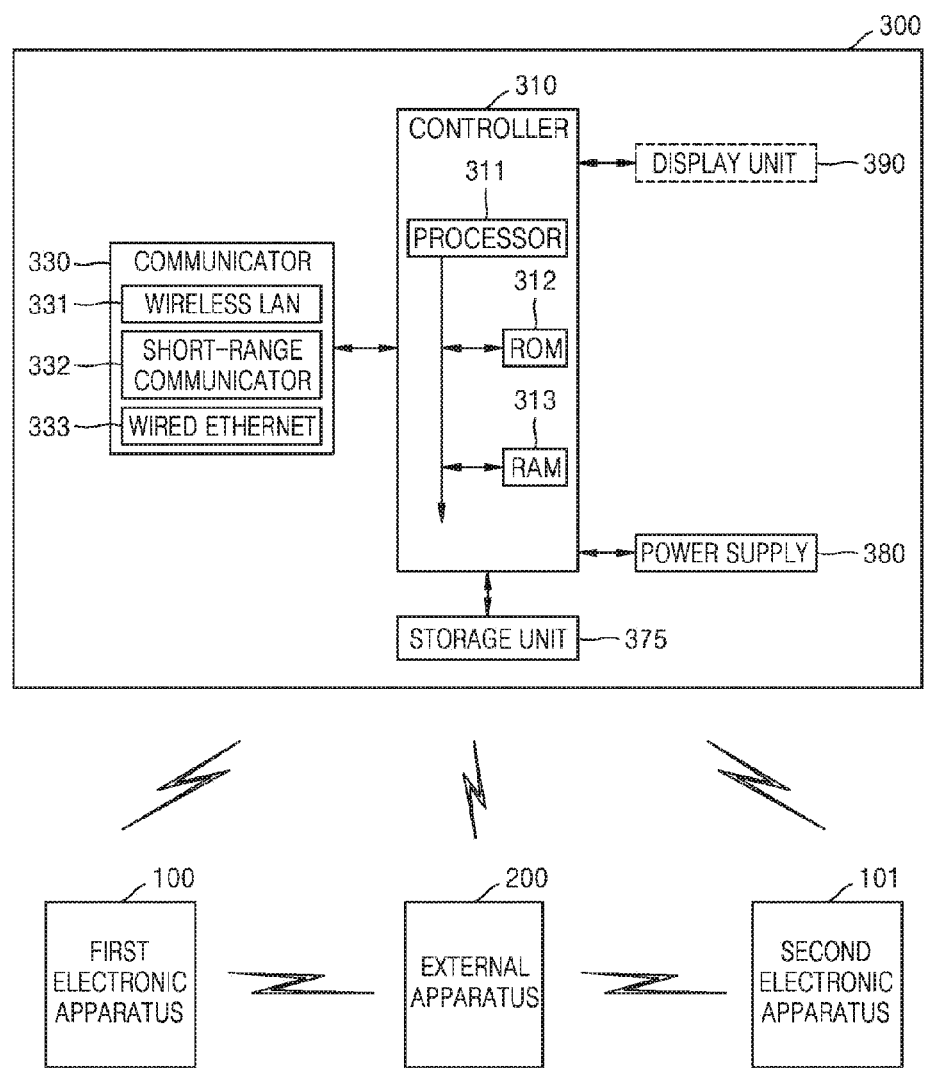
FIG. 2C is a block diagram of a server according to an embodiment of the present disclosure.

FIG. 2C is a block diagram of a server according to an embodiment of the present disclosure.

Referring to FIG. 2C, a server 300 may wirelessly or wiredly connect to at least one of the first electronic apparatus 100 and the external apparatus 200 through a communicator 330. The server 300 may request state information from the external apparatus 200. The server 300 may receive the state information from the external apparatus 200. The server 300 may receive a request corresponding to transmission of the state information of the external apparatus 200 from the first electronic apparatus 100. The server 300 may transmit the state information of the external apparatus 200 to the first electronic apparatus 100.

The server 300 according to an embodiment may refer to a computing apparatus that may store state information received from the external apparatus 200 and may transmit the stored state information to the first electronic apparatus 100 and/or the second electronic apparatus 101. Examples of the server 300 may include a gateway (not shown), a home network server (not shown), and a cloud server (not shown). A display apparatus or a refrigerator may also function as the server 300.

The server 300 may include a controller 310, the communicator 330, a storage unit 375, a power supply 380, and a display unit 390.

The controller 310 includes a processor 311 and a ROM 312 in which a control program for controlling the server 300 is stored. The controller 310 may also include a RANI 313 in which a signal or data input from the outside of the server 300 is stored or data for various operations performed by the server 300 is stored.

The controller 310 controls the power supply 380 to supply power to the elements 330 through 390.

The controller 310 may control the communicator 330, the storage unit 375, the power supply 380, and the display unit 390.

The controller 310 may control an execution request of a second group action that controls one or more external apparatuses connected to the server 300 to be received from the second electronic apparatus 101, an execution request of a first group action that controls some of the external apparatuses to be received from the first electronic apparatus 100, and group action solution information corresponding to a group action conflict between the second group action that is being executed and the first group action that is requested to be executed to be transmitted to the first electronic apparatus 100.

The controller 310 may control one of an alarm setting and a recommended group action corresponding to the group action conflict included in the group action solution information to be transmitted to the first electronic apparatus 100.

The controller 310 may control one of a plurality of recommended group actions and one recommended group action corresponding to the group action conflict to be transmitted to the first electronic apparatus 100.

The controller 310 may control the group action conflict to be determined by the same external apparatus that is commonly included in the first group action and the second group action.

The controller 310 may control the group action conflict to be determined by using a first group action working area corresponding to the first group action and a second group action working area included in the second group action.

The controller 310 may control the group action conflict to be determined by first group action characteristics corresponding to the first group action and second group action characteristics corresponding to the second group action.

The controller 310 may control the group action conflict to be determined by using state information of an external apparatus that is changed in response to execution of the second group action and state information of some of the external apparatuses corresponding to the first group action.

The controller 310 may request some of the external apparatuses corresponding to the first group action for state information according to the received execution request of the first group action.

The controller 310 may control group action conflict information corresponding to a conflict of the first group action to be transmitted to the first electronic apparatus 100.

The controller 310 may control group action solution information corresponding to the conflict of the first group action to be transmitted to the first electronic apparatus.

The controller 310 may receive external apparatus state information from each of the external apparatuses 200 through the communicator 330. The controller 310 may transmit the received external apparatus state information to the first or second electronic apparatus 100 or 101 through the communicator 330.

The controller 310 may generate a group action, a recommended group action, or a recommended group action list by using the external apparatus state information received through the communicator 330, and may transmit the generated group action, the generated recommended group action, or the generated recommended group action list to the first or second electronic apparatus 100 or 101.

The controller 310 may receive a control packet corresponding to execution of a group action through the communicator 330 from the first or second electronic apparatus 100 or 101.

The controller 310 may analyze the external apparatus state information received through the communicator 330 by using management software and may generate group action conflict information or group action conflict history.

The controller 310 may generate solution information corresponding to a group action conflict that occurs between the first group action that is requested to be executed and the second group action that is being executed.

The controller 310 may transmit the group action conflict information, the group action conflict history, or the group action solution information to the first electronic apparatus 100 through the communicator 330.

The communicator 330 may be wirelessly or wiredly connected to the first and second electronic apparatuses 100 and 101, and the external apparatus 200 under the control of the controller 310. The communicator 330 may include at least one of a wireless LAN 331, a short-range communicator 332, and a wired Ethernet 333. For example, the communicator 330 may include one of the wireless LAN 331, the short-range communicator 332, and the wired Ethernet 333, or may include a combination of the wireless LAN 331, the short-range communicator 332, and the wired Ethernet 333.

The wireless LAN 331 may be wirelessly connected to an AP in a place where the AP is provided under the control of the controller 310. The wireless LAN 331 may include, for example, Wi-Fi. The wireless LAN 331 supports the IEEE802.11x wireless LAN standard of the IEEE. The short-range communicator 332 may wirelessly perform short-range communication between the first electronic apparatus 100 and the external apparatus 200 without an AP under the control of the controller 310. Examples of short-range communication may include Bluetooth, BLE, IrDA, UWB, and NFC.

The communicator 330 may receive external apparatus state information or external apparatus environment information from the external apparatus 200 under the control of the controller 310.

The communicator 330 may receive a request corresponding to transmission of the external apparatus state information or the external apparatus environment information from the first or second electronic apparatus 100 or 101 under the control of the controller 310.

The communicator 330 may transmit the external apparatus state information or external apparatus environment information to the first or second electronic apparatus 100 or 101 under the control of the controller 310.

The communicator 300 may transmit conflict information, group action conflict history, or solution information to the first or second electronic apparatus 100 or 101 under the control of the controller 310.

The server 300 may include a speaker (not shown) that outputs an audio.

The storage unit 375 may store a control program and various data for driving and controlling the server 300 under the control of the controller 310. The storage unit 375 may store data or signals input/output in response to operations of the communicator 330, the power supply 380, and the display unit 390.

The storage unit 375 may store external apparatus environment information, external apparatus state information, electronic apparatus environment information, or electronic apparatus state information.

The storage unit 375 may store one or more group actions.

The storage unit 375 may store a control packet corresponding to execution of a group action.

The storage unit 375 may store management software (not shown) that manages the first and second electronic apparatuses 100 and 101, the external apparatus 200, state information of the first and second electronic apparatuses 100 and 101, and state information of the external apparatus 200.

The storage unit 375 may store changed state information of the external apparatus 200 that is received in response to the control packet transmitted to the external apparatus 200.

Examples of the storage unit 375 may include a nonvolatile memory, volatile memory, HDD, or SSD.

The power supply 380 supplies power input from an external power source to the elements 330 through 390 of the server 300 under the control of the controller 310.

The display unit 390 may display a symbol, image, or text corresponding to information (e.g., environment information, state information, or a control command) received from the external apparatus 200 or the first electronic apparatus 100 under the control of the controller 310. The display unit 390 may use, for example, an LCD method, an OLED method, a plasma display panel (PDP) method, or a vacuum fluorescent display (VFD) method. It will be understood by one of ordinary skill in the art that video and/or text information that may be displayed may vary according to a display method.

It will be understood by one of ordinary skill in the art that at least one element may be added to or deleted from the elements (e.g., 330 through 390) of the server 300 of FIGS. 1 and 2C according to the desired performance of the server 300.

Figure 3A:
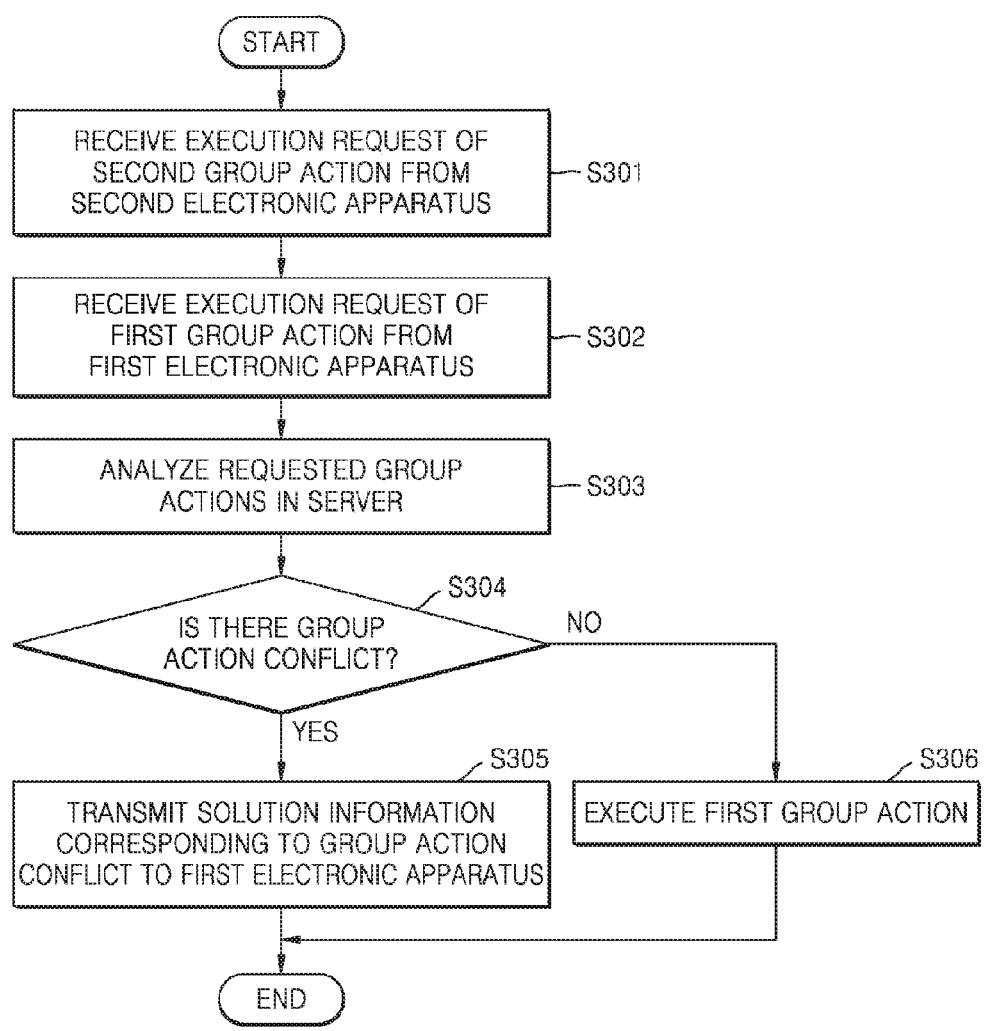
FIG. 3A is a flowchart of a method of controlling a group action of a server according to an embodiment of the present disclosure.

FIG. 3A is a flowchart of a method of controlling a group action which is performed by a server according to an embodiment of the present disclosure.

Figure 4A:
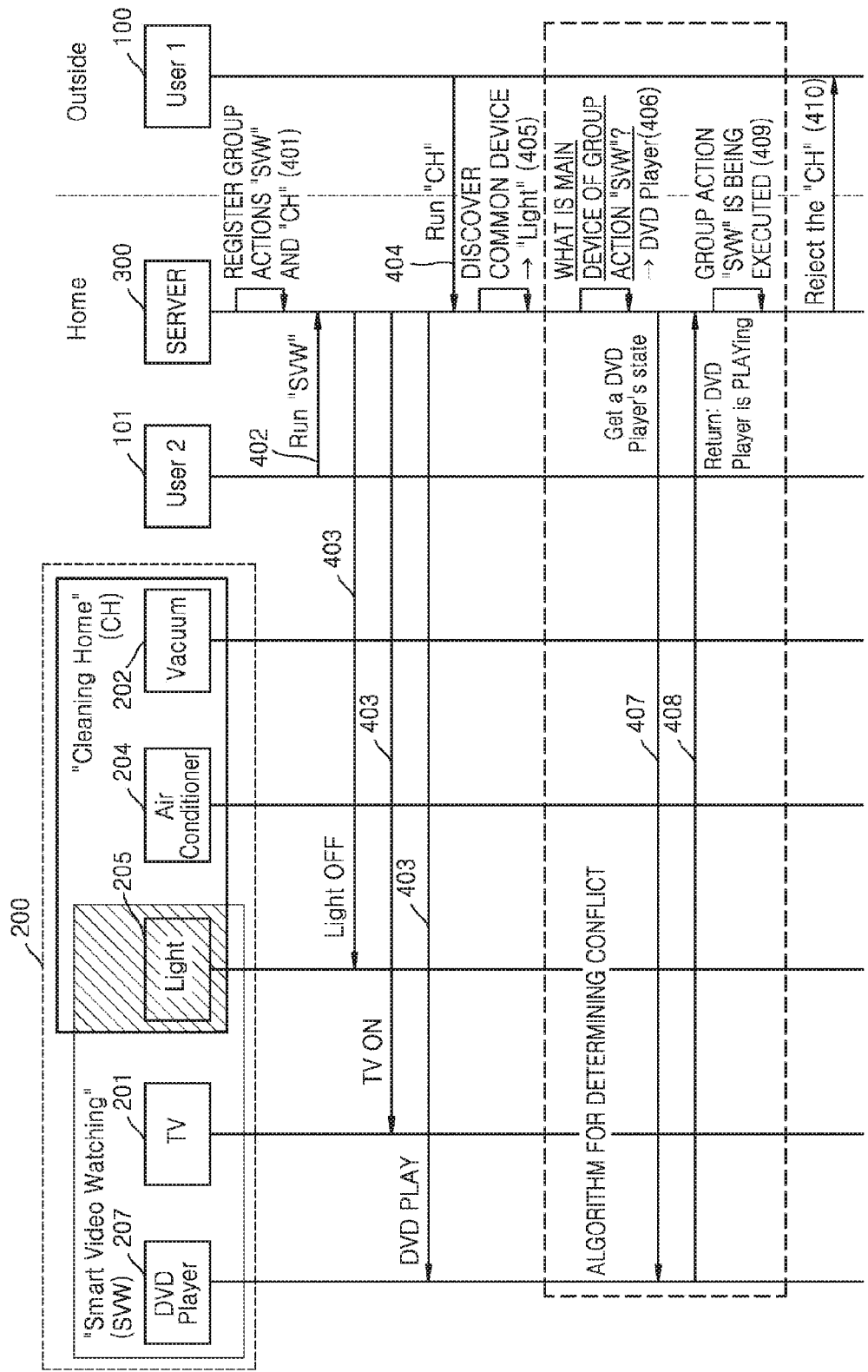
FIG. 4A is a sequence diagram for illustrating a method of controlling a group action according to an embodiment of the present disclosure.
Figure 4B:
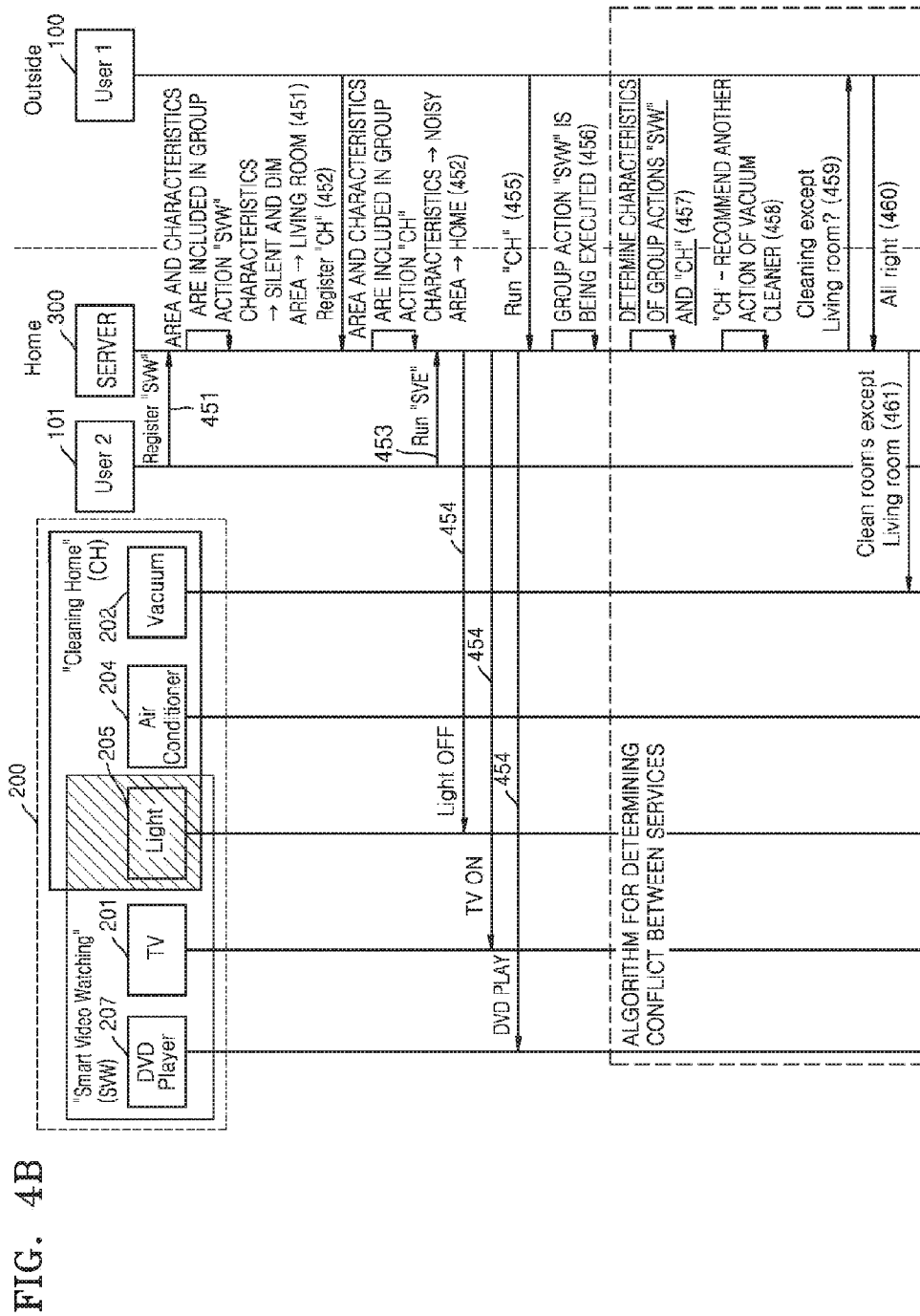
FIG. 4B is a sequence diagram for illustrating a method of controlling a group action according to an embodiment of the present disclosure.

FIGS. 4A and 4B are sequence diagrams for illustrating a method of controlling a group action according to an embodiment of the present disclosure.

FIGS. 5A to 5I are views illustrating screens of first and second electronic apparatuses according to an embodiment of the present disclosure.

Referring to FIG. 3A, in operation S301, a request to execute a second group action is received from the second electronic apparatus 101.

When an input of a second user is received, the second electronic apparatus 101 may request the server 300 to execute the second group action. The server 300 may receive the execution request of the second group action from the second electronic apparatus 101.

Figure 5A:
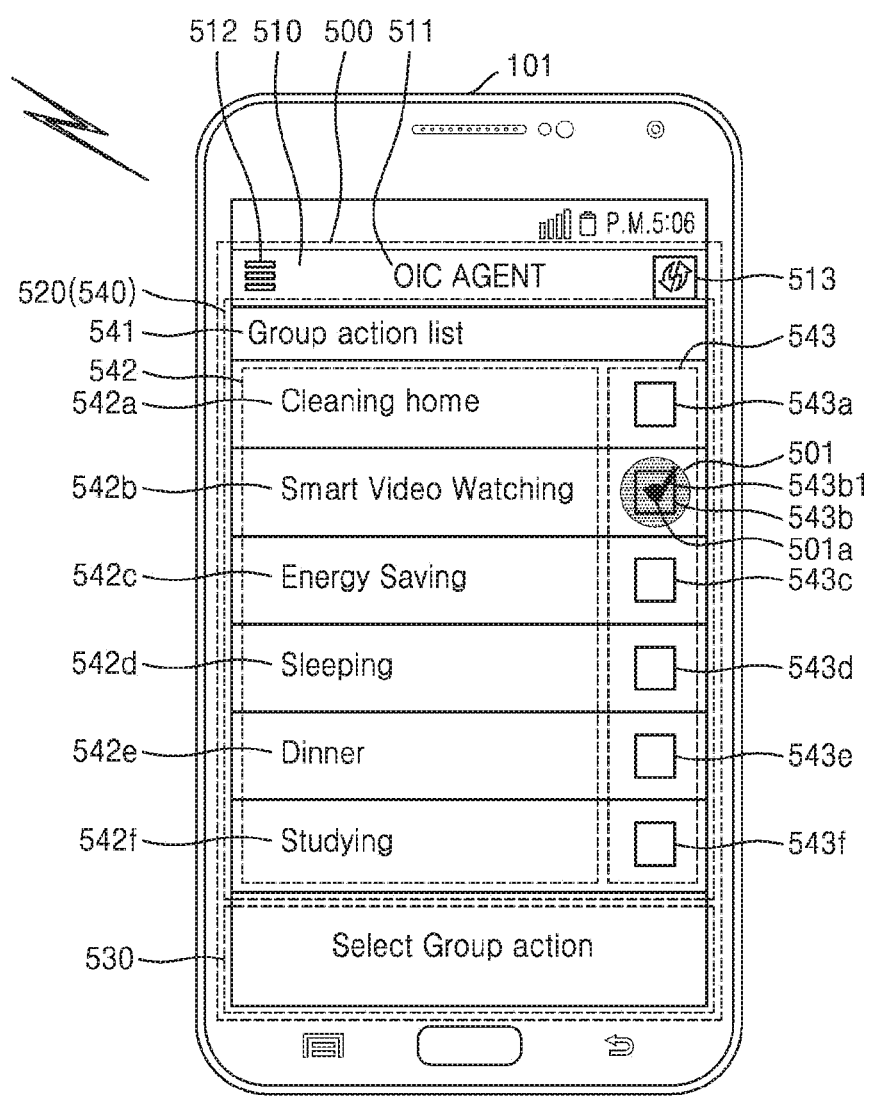
FIGS. 5A to 5I are views illustrating screens of first and second electronic apparatuses according to an embodiment of the present disclosure.

Referring to FIGS. 4A, 4B, and 5A, the second user may execute the second group action (e.g., operations 401, 402, 403, 451, 453, and 454) in the second electronic apparatus 101.

Before the second user executes the second group action in the second electronic apparatus 101, the second user may touch (not shown) the shortcut icon 193a corresponding to an application (e.g., an application for controlling an external apparatus in a home) that is selected from among the shortcut icons 193a through 193i displayed on a screen of the second electronic apparatus 101. The controller 110 may detect the touch (not shown) by using the touchscreen 190 and the touchscreen controller 195. The controller 110 may calculate a touch position (e.g., X and Y coordinates, not shown) corresponding to the touch by using an electrical signal received from the touchscreen controller 195.

The controller 110 may store touch position information corresponding to the touch position (not shown) in the storage unit 175. The storage touch position information may include a touch ID, touch position, touch detection time, or touch information (e.g., a touch pressure, touch direction, or touch duration) for history management.

Figure 5B:
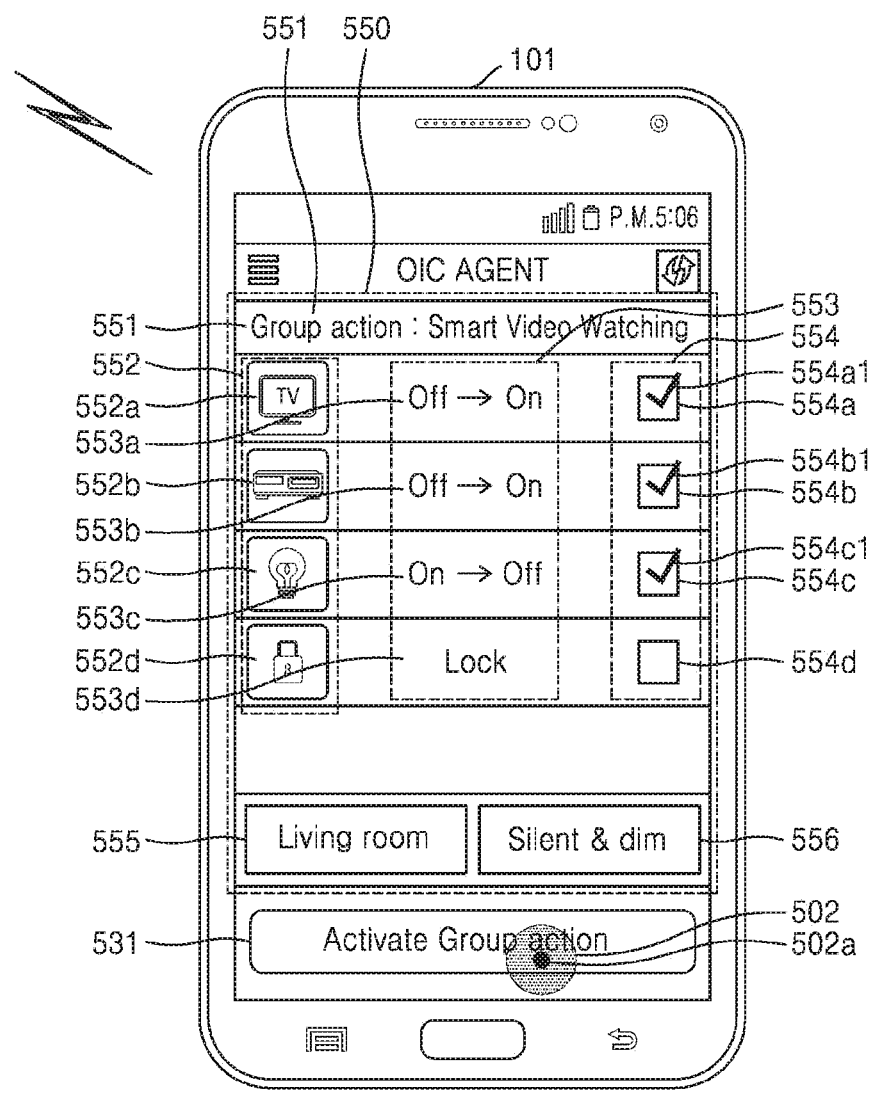

Referring to FIGS. 5A and 5B, a controller 110 of the second electronic apparatus 101 may display an application screen 500 corresponding to the touch.

The application screen 500 may include an application name area 510, a display area 520, and an interaction area 530. The display area 520 on the application screen 500 may include the interaction area 530. When the display area 520 includes the interaction area 530, the application screen 500 may display the application name area 510 and the display area 520.

The application name area 510 may include an application name 511, a menu 512, or a refresh 513. The menu 512 and/or the refresh 513 may be displayed as one of text, image, and symbol.

Figure 5C:
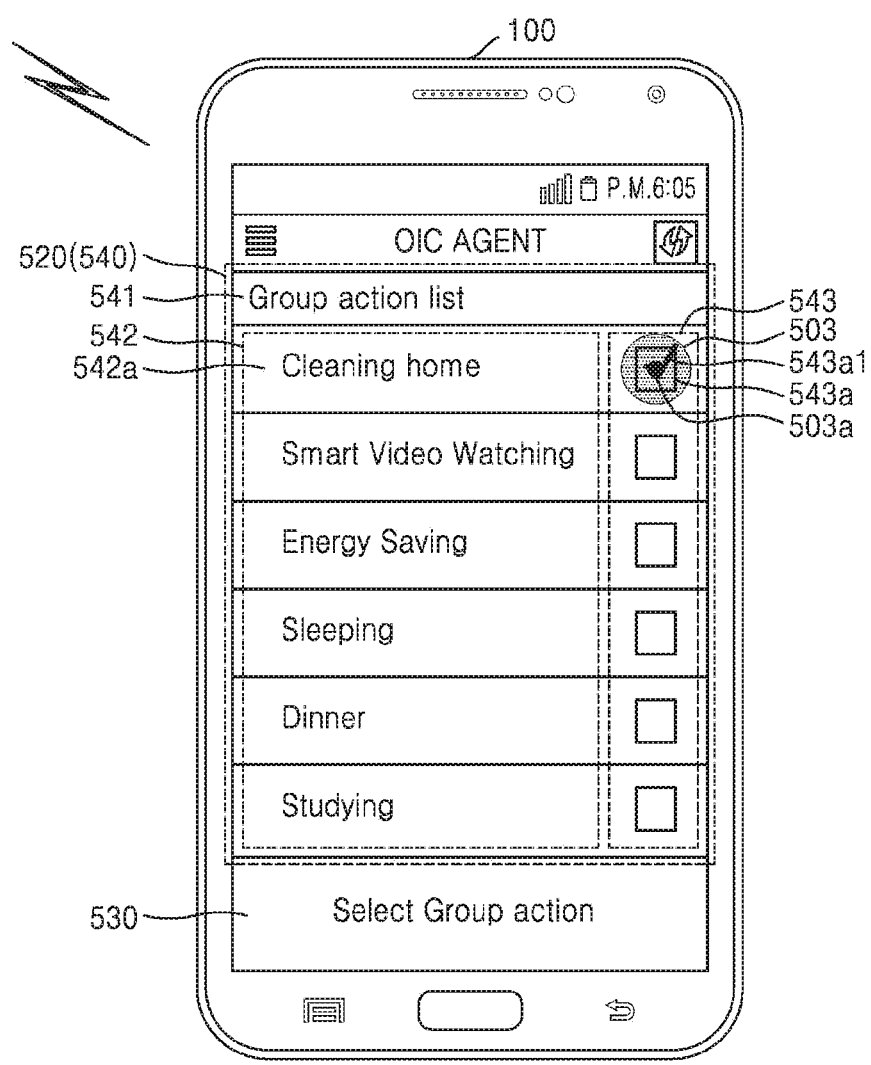
Figure 5D:
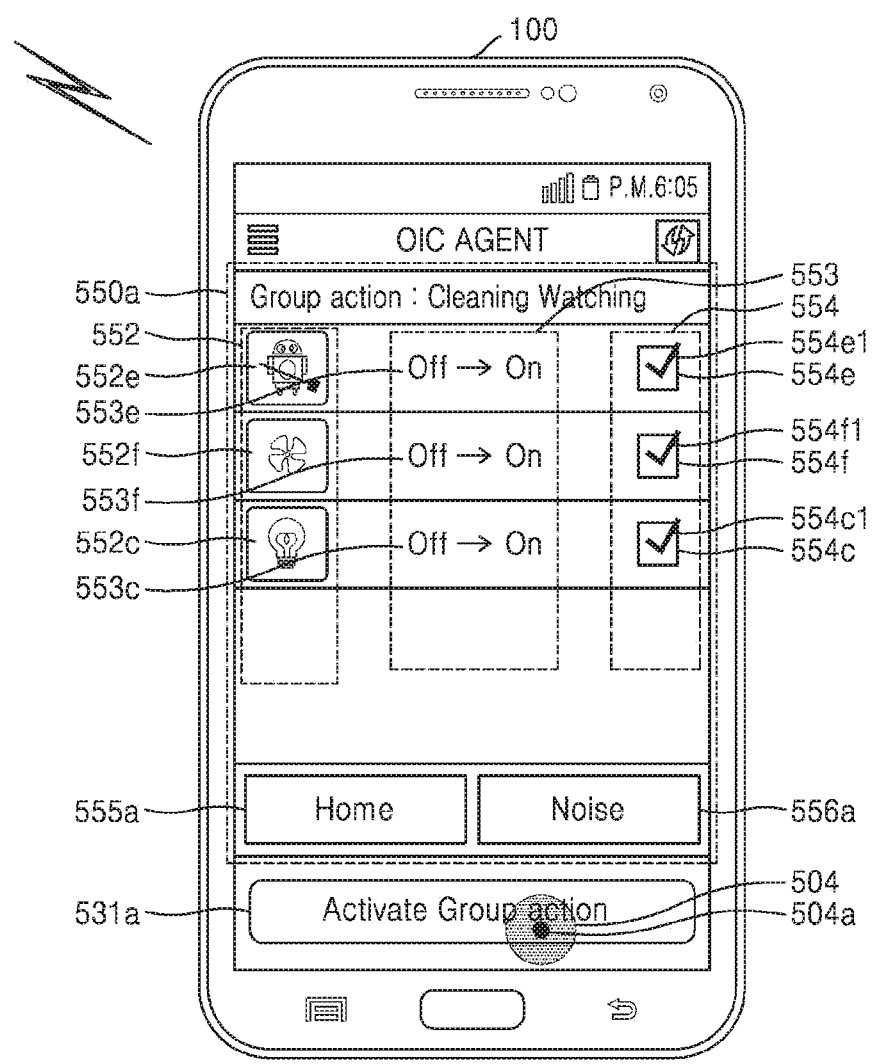
Figure 5E:
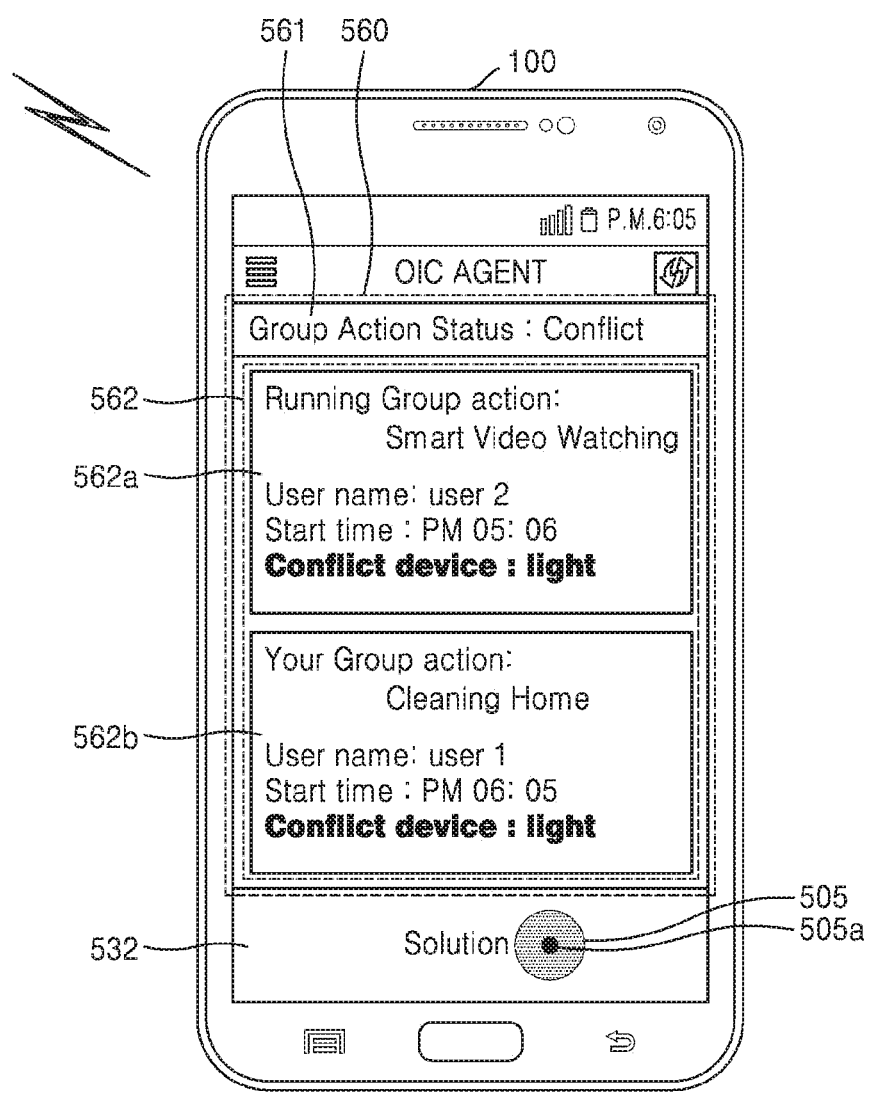
Figure 5F:
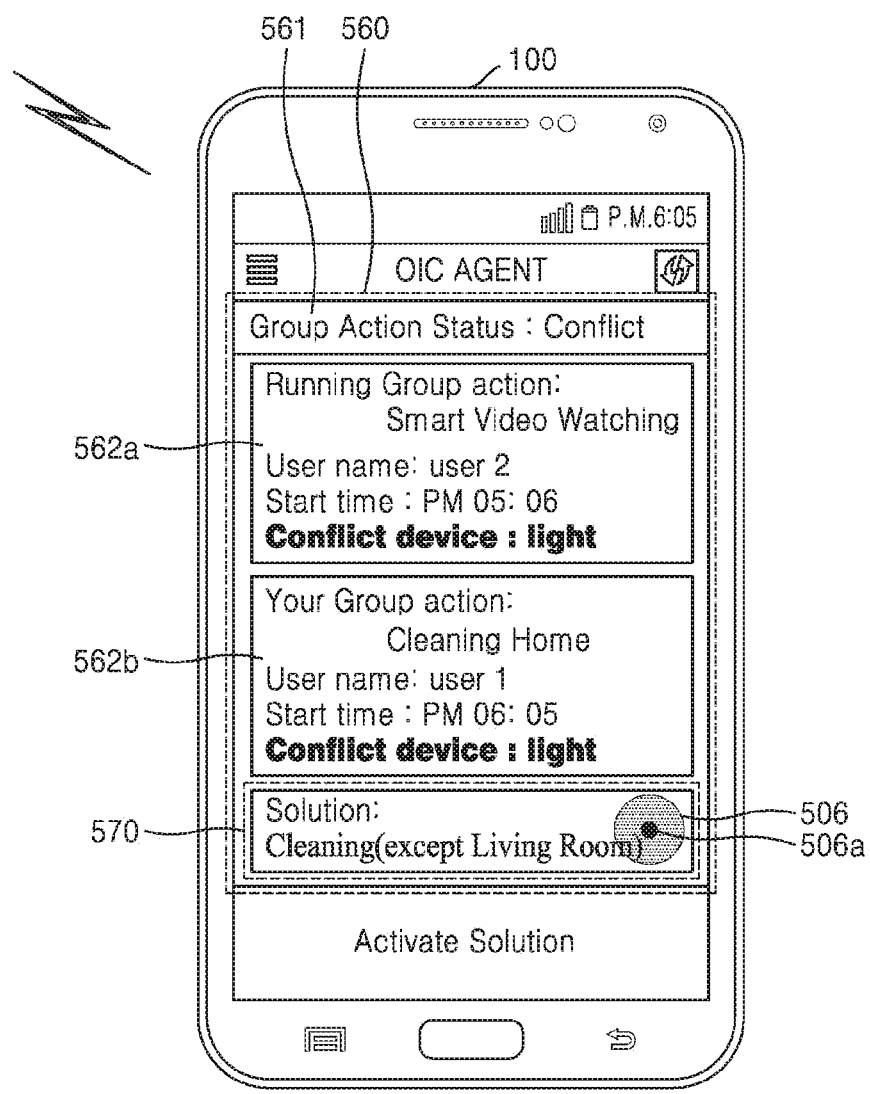
Figure 5G:
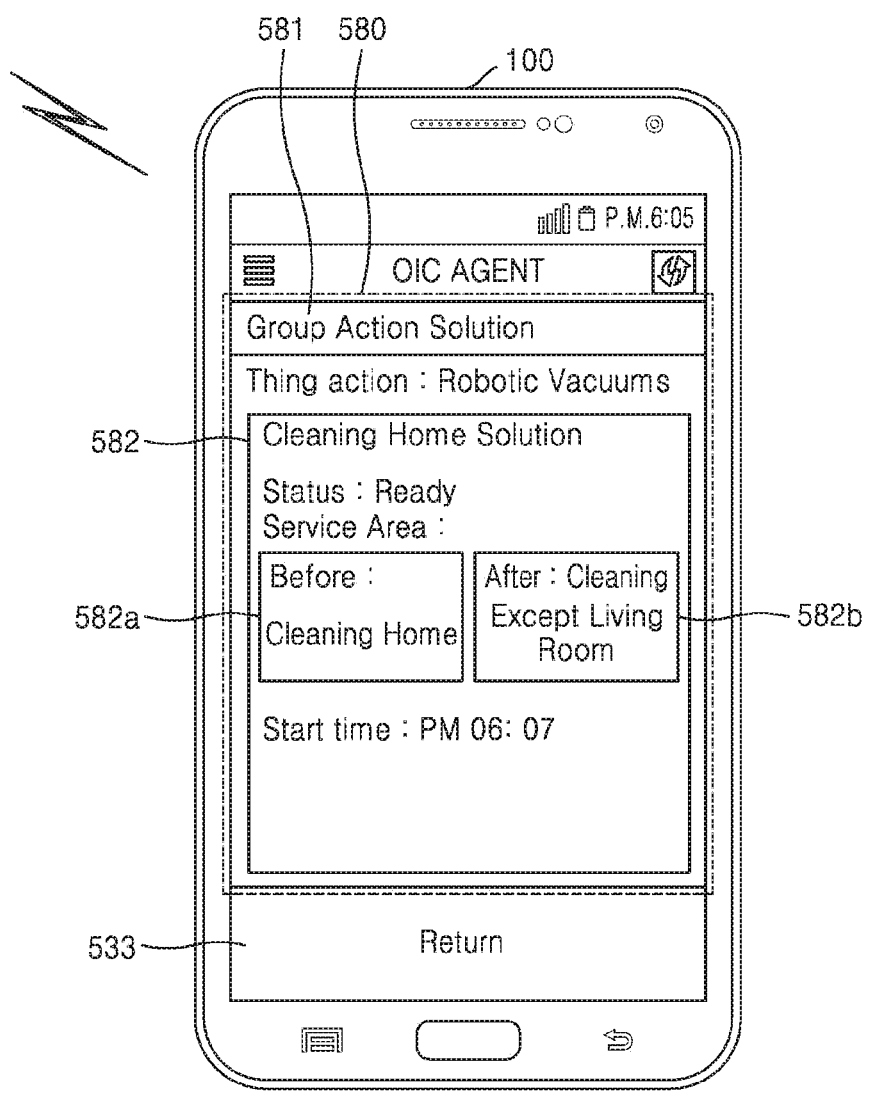
Figure 5H:
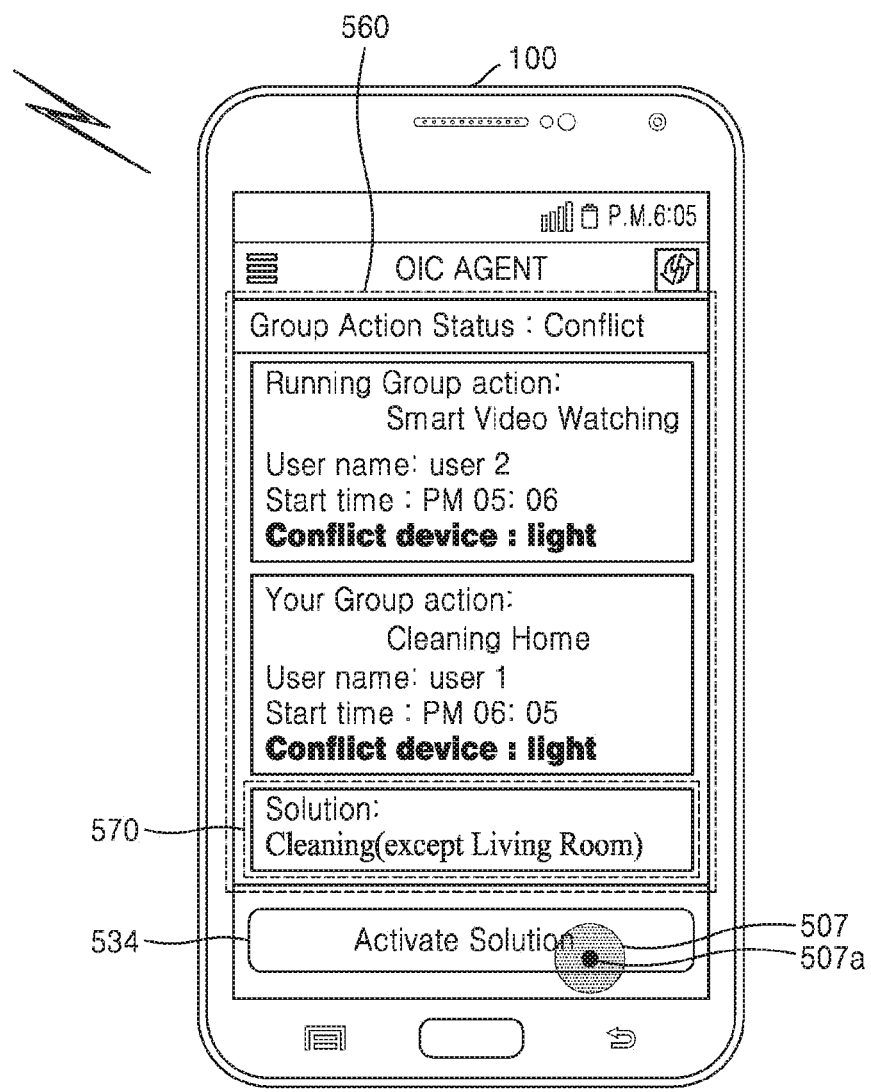
Figure 5I:
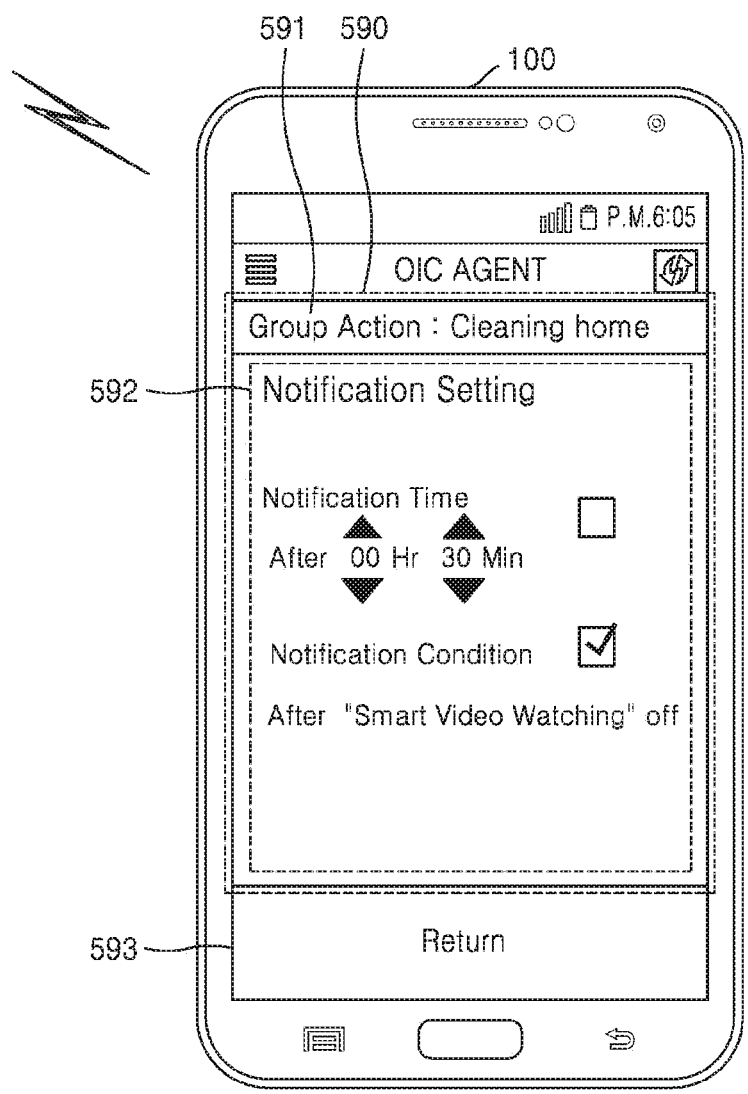

Various screens provided from an application may be displayed on the display area 520. Examples of the various screens may include a group action list screen 540 as illustrated in FIGS. 5A and 5C, a group action detail screen 550 as illustrated in FIG. 5B, a group action conflict screen 560 as illustrated in FIGS. 5E, 5F and 5H, a group action solution screen 570 as illustrated in FIGS. 5H and 5F, a solution detail screen 580 as illustrated in FIG. 5G, and a group action notification setting screen 590 as illustrated in FIG. 5I. Also, the second electronic apparatus 101 may not only display the various screens on the display area 520, but also receive a user input (e.g., a touch or touch gesture) or an input of an input unit (e.g., a stylus pen, not shown).

A detailed explanation of the various screens displayed on the display area 520 will be explained below.

The application screen 500 may include the interaction area 530 that displays an interaction (e.g., text or an image) provided from an application to a user or receives an interaction (e.g., a touch or touch gesture) input from the user to the application.

In FIG. 5A, the group action list screen 540 is displayed on the display area 520.

Referring to FIGS. 4A and 4B, the user may register one or more group actions at operation 401.

The one or more group actions may be stored in the storage unit 175 of the first electronic apparatus 100 or the storage unit 375 of the server 300.

The group action list screen 540 may include a display area name 541, one or more group actions 542 that may be selected by a user (e.g., the second user), and a selection box 543. The one or more group actions 542 that may be selected by the user may be displayed.

The group actions 542 that may be selected by the user and that are displayed on the group action list screen 540 may include cleaning home 542a, smart video watching 542b, energy saving 542c, sleeping 542d, dinner 542e, or studying 542f. Also, although not shown, the group actions may include a blocking mode, an urgent mode, a delay mode, a safe mode, a cooling mode, a heating mode, a bright mode, or a dark mode. It will be understood by one of ordinary skill in the art that the group actions are not limited to those shown, and modifications to the actions may be made by the user. Accordingly, the selection box 543 includes a selection box 543a for cleaning home 542a, a selection box 543b for smart video watching 542b, a selection box 543c for energy saving 542c, a selection box 543d for sleeping 542d, a selection box 543e for dinner 542e, and a selection box 543f for studying 542f.

The second user makes a first touch 501 on one group action (e.g., the smart video watching 542b) of the group action list 542. The second user may also make the first touch 501 on the selection box 543b corresponding to the smart video watching 542b on the group action list screen 540.

The controller 110 of the second electronic apparatus 101 may detect the first touch 501 by using the touchscreen 190 and the touchscreen controller 195. The controller 110 of the second electronic apparatus 101 may calculate a first touch position 501a (e.g., X1 and Y1 coordinates) corresponding to the first touch 501 by using an electrical signal received from the touchscreen controller 195.

The controller 110 of the second electronic apparatus 101 may store first touch position information corresponding to the first touch position 501*a* in the storage unit 175. The stored first touch position information may include a touch ID, touch position, touch detection time, or touch information (e.g., a touch pressure, touch direction, or touch duration) for history management.

The controller 110 of the second electronic apparatus 101 may display a check mark 543*b*1 on the selection box 543*b* in response to the first touch 501. The controller 110 of the second electronic apparatus 101 may also display the group action detail screen 550 in response to the first touch 501.

Referring to FIG. 5B, the group action detail screen 550 is displayed on the display area 520.

The group action detail screen 550 may display a display area name 551, an ID (e.g., an icon) 552 corresponding to the external apparatus 200, and a state 553 of the external apparatus 200. The group action detail screen 550 may further include a selection box 554 that displays a selection of the second user. The group action detail screen 550 may also display a group action working area 555 indicating a working area of the external apparatus 200 corresponding to a group action or group action characteristics 556 corresponding to working characteristics of the external apparatus 200 corresponding to the group action.

A display apparatus 552*a*, a DVD player 552*b*, and a lamp 552*c* are selected from among the display apparatus 552*a*, the DVD player 552*b*, the lamp 552*c*, and an auto door lock 552*d* displayed on the group action detail screen 550 corresponding to the smart video watching 542*b*, and thus check marks 554*a*1 through 554*c*1 are displayed on selection boxes 554*a* through 554*c*.

The ID 552 of the external apparatus 200 displayed on the group action detail screen 550 may include the display apparatus 552*a*, the DVD player 552*b*, the lamp 552*c*, or the auto door lock 552*d*. Also, the ID 552 of the external apparatus 200 displayed on the group action detail screen 550 may include a robot cleaner 552*e* or an air conditioner 552*f* as illustrated in FIG. 5D. The state 553 of each may include, for example, on/off states 553*a*, 553*b*, 553*c*, 553*e* and 553*f*, and lock/unlock state 553*d*.

Although not shown, the external apparatus 200 may connect to the first or second electronic apparatus 100 or 101 or the server 300 through the communicator 230. The external apparatus 200 may detect an internal state or an external state of the external apparatus 200 by using the function unit 260 or the sensor unit 270 and may transmit the detected internal or external state to the first or second electronic apparatus 100 or 101 or the server 300 through the communicator 230 under the control of the controller 210.

It will be understood by one of ordinary skill in the art that the external apparatus 200 is not limited to those shown, and may be any of various other external apparatuses that may transmit state information at a transmission time or changed state information through the communicator 230.

A state of the external apparatus 200 according to an embodiment may refer to context of the external apparatus 200. State information corresponding to a state of the external apparatus 200 may refer to context information of the external apparatus 200. A state change of the external apparatus 200 may refer to a context change of the external apparatus 200.

State information of the external apparatus 200 may include items such as an ID, an external apparatus name, operation information (e.g., information about busy, standby, power on/off, or data transfer) of the external apparatus 200, spatial information (e.g., information about a location, a movement direction, or a movement speed) of the external apparatus 200, environment information (e.g., information about temperature, humidity, illuminance, or noise) of the external apparatus 200, available resource information (e.g., information about remaining battery amount, display resolution, processor clock speed, or memory resources) of the external apparatus 200, history information (e.g., history information about an operation time or a standby time) corresponding to an operation of the external apparatus 200, or obstruction information (e.g., information about an obstructed portion, an obstruction time, an after-service (A/S), or an A/S date) of the external apparatus 200.

State information of the first electronic apparatus 100 may include items such as an ID, an electronic apparatus name, operation information (e.g., information about busy, standby, power on/off, or data transfer) of the first electronic apparatus 100, spatial information (e.g., information about a location, a movement direction, or a movement speed) of the first electronic apparatus 100, environment information (e.g., information about temperature, humidity, illuminance, or noise) of the first electronic apparatus 100, available resource information (e.g., information about remaining battery amount, display resolution, processor clock speed, or memory resources) of the first electronic apparatus 100, history information (e.g., history information about an operation time or a standby time) corresponding to an operation of the first electronic apparatus 100, or obstruction information (e.g., information about an obstructed portion, an obstruction time, an A/S, or an A/S date) of the first electronic apparatus 100. Also, state information of the first electronic apparatus 100 may include user information (e.g., a user ID, password, user name, or bio-information (e.g., information about a fingerprint, iris, pulse, blood pressure, or body temperature) corresponding to a user who carries the first electronic apparatus 100.

A state of the external apparatus 200 that is located around the user (e.g., in a living room, kitchen, room, office, or conference room) may be changed by a user input. A state and a state change of the external apparatus 200 may be detected by using a sensor (not shown) that detects a movement of a mechanical/electronic switch or the sensor unit 270 of the external apparatus 200.

A state of the external apparatus 200 located around the user may be automatically changed by preset conditions (e.g., sunset or rain). A state of the external apparatus 200 may also be changed (e.g., cleaning may start) when a state of the user is changed (e.g., the user goes out) or when preset conditions are satisfied (e.g., preset conditions in which cleaning is performed at 3 p.m. are satisfied).

The user may automatically or manually change a state of the external apparatus 200 that is located around the user when a state of the user is changed (e.g., the user goes out or sleeps). The user may manually change a state of the external apparatus 200 by directly changing a state of the external apparatus 200 (e.g., by pressing a power button of the external apparatus 200) or by using an application of the first electronic apparatus 100.

Before the user goes out of a home, the user may manually change a state of the external apparatus 200, for example, may turn off the display apparatus 201, turn on the robot cleaner 202, turn on the washing machine 203, turn off the air conditioner 204, turn off the lamp 205, or lock the auto door lock 206. Also, before the user goes out of the home, the user may change states of the external apparatuses 201 through 206 that are located in the home by using any of various combinations. For example, the various combinations may include a state change order of the external apparatuses 201 through 206, or a state change number of the external apparatuses 201 through 206 (e.g., a state of only one external apparatus may be changed, states of only two external apparatuses may be changed, states of only three external apparatuses may be changed, states of only four external apparatuses may be changed, states of only five external apparatuses may be changed, or states of all external apparatuses may be changed).

The group action working area 555 displayed on the group action detail screen 550 may include a home, living room, kitchen, room, office, or conference room. When a group action is generated, the user may set the group action working area 555 indicating a space where the group action is to be performed. Accordingly, the external apparatus 200 may perform the group action in the space set as the group action working area 555. For example, power on/off of the lamp 205 included in the selected group action may be set (so that, for example, a lamp of the home is turned on/off, a lamp of the living room is darkest, or a lamp of the studying room is brightest). As further example, a cleaning area (e.g., the home or the living room) of the robot cleaner 202 included in the selected group action may be set.

It will be understood by one of ordinary skill in the art that the group action working area is not limited to those described, and there may be various other group action working areas.

The controller 310 of the server 300 according to an embodiment may determine if there is a conflict or conflicts between a group action that is requested to be executed and a group action that is being executed by using the group action working area 555. The controller 110 of the first electronic apparatus 100 may also determine a group action conflict between a group action that is requested to be executed and a group action that is being executed by using the group action working area 555.

The group action characteristics 556 displayed on the group action detail screen 550 may include silent, dim, silent and dim, noisy, cold, or hot. The group action characteristics 556 may be combined (e.g., silent and dim). When a group action is generated, the user may set the group action characteristics 556 corresponding to operation characteristics of the external apparatus 200 corresponding to the group action. For example, group action characteristics of the cleaning home 542a that is one of the group actions 542, may be noisy. Group action characteristics of the smart video watching 542b that is another one of the group actions 542, may be "silent and dim". Accordingly, a conflict between actions may be detectable.

It will be understood by one of ordinary skill in the art that the group action characteristics are not limited to those described, and there are various other group action characteristics.

The controller 310 of the server 300 according to an embodiment may determine a group action conflict between a group action that is requested to be executed and a group action that is being executed by using the group action characteristics 556. The controller 110 of the first electronic apparatus 100 may also determine a group action conflict between a group action that is requested to be executed and a group action that is being executed by using the group action characteristics 556.

The second user may change selections of the selection boxes 554a through 554d of the group action detail screen 550. Selections of the selection boxes 554a through 554d may be changed by a touch (not shown) of the second user. For example, when the second user makes a touch (not shown) on the selection box 554c corresponding to the lamp 552c, the controller 110 of the second electronic apparatus 101 may cause the check mark 554c1 of the selection box 554c to disappear in response to the touch of the second user. The controller 110 of the second electronic apparatus 101 may also cause the check mark 554a1 or 554c1 of the selection box 554a or 554c to disappear in response to an additional touch (not shown) of the second user.

The second user makes a second touch 502 on a button 531 corresponding to execution of the smart video watching 542b that is a selected group action.

The controller 110 of the second electronic apparatus 101 may detect the second touch 502 by using the touchscreen 190 or the touchscreen controller 195.

The controller 110 of the second electronic apparatus 101 may also calculate a second touch position 502a (e.g., X2 and Y2 coordinates) corresponding to the second touch 502 by using an electrical signal received from the touchscreen controller 195.

The controller 110 of the second electronic apparatus 101 may store second touch position information corresponding to the second touch position 502a in the storage unit 175. The stored second touch position information may include a touch ID, touch position, touch detection time, or touch information (e.g., a touch pressure, touch direction or touch duration) for history management.

Referring to FIGS. 4A and 4B, when the second touch 502 is detected, the controller 110 of the second electronic apparatus 101 may request the server 300 to execute the smart video watching 542b that is a selected second group action at operations 402 and 453.

Also, when the second touch 502 is detected, the controller 110 of the second electronic apparatus 101 may directly request the external apparatus 200 corresponding to the smart video watching 542b to execute the smart video watching 542b that is displayed.

When the second touch 502 is detected, the controller 110 of the second electronic apparatus 101 may generate a control command (e.g., a control packet) for changing a state of the external apparatus 200 included in second group action information corresponding to the smart video watching 542b.

The controller 110 of the second electronic apparatus 101 may transmit the generated control command to the server 300 through the communicator 130. The controller 110 may generate a control command corresponding to each external apparatus 200 (e.g., the display apparatus 201). The controller 110 of the second electronic apparatus 101 may also generate one integrated control command corresponding to all external apparatuses 200. Further, a control command transmitted through the communicator 130 may have a hierarchical structure.

A control packet corresponding to a control command may include three frames including a media access control (MAC) header (not shown) corresponding to a receiver (e.g., server) address and a length, a payload (not shown) corresponding to a state information change of the external apparatus 200, and a cyclical redundancy check (not shown) corresponding to transmission error detection.

The storage unit 175 may store the control command that is generated in response to execution of the smart video watching 542b under the control of the controller 110.

The controller 310 of the server 300 may receive the control command corresponding to the smart video watching 542b transmitted from the second electronic apparatus 101 through the communicator 330. The received control command may be stored in the storage unit 375 under the control of the controller 310.

Table 1 shows a control command corresponding to the smart video watching 542b transmitted from the second electronic apparatus 101 and stored in the storage unit 375 of the server 300.

TABLE 1

| Variable | Example | Description |
| --- | --- | --- |
| Name | Smart Video Watching | Group action name |
| Owner | User 2 | Group action owner |
| User | User 2 | Group action executor |
| Start Time | PM 05:06:00 | Group action start time |
| End Time | PM 07:46:27 | Group action end time |
| Member | TV, DVD Player, Light | Group action resources member |
| Dominant Member | DVD Player | Group action dominant member |
| Action List | 3 | |
| Service Area | (On, Living room) | Group action Resource working area (Semantic Location) |
| Service Characteristic | (On, Silent) (On, Darkness) | Group action Characteristic |
| User Request | "No interrupt mode" | User input service mode. i.e., "No interrupt mode" → !MAKE_SOUND && !BRIGHTNESS |

Group action information may include a group action name, a name of a user who generates a group action, a name of a user who executes the group action, a group action start time, a group action end time, external apparatuses included in the group action, a dominant member of the group action that determines whether to execute a service of the group action, a group action list, the number of actions included in the group action, a service area where the group action is executed, characteristics of the group action, and a user request that is a service mode directly selected by the user to execute the group action.

It will be understood by one of ordinary skill in the art that the group action information is not limited to those described, and may include any items indicating various states of external apparatuses.

The controller 310 of the server 300 may generate a control command corresponding to a request of external apparatus state information of the external apparatuses, e.g., the display apparatus 201, the lamp 205, and the DVD player 207 corresponding to the smart video watching 542b by using the received control command and stored external apparatus information. The controller 310 of the server 300 may transmit the generated control command to each of the display apparatus 201, the lamp 205, and the DVD player 207. The controller 310 may also transmit one integrated control command corresponding to the request of the external apparatus state information to each of the display apparatus 201, the lamp 205, and the DVD player 207.

The controller 310 of the server 300 may further determine a dominant external apparatus (e.g., the DVD player 207) in the smart video watching 542b. The dominant external apparatus may be an external apparatus that is important in executing a service of the smart video watching 542b. For example, when the group action is video watching, the dominant external apparatus may be the DVD player 207 that reproduces a video. When the group action is cleaning home, the dominant external apparatus may be the robot cleaner 202. The dominant external apparatus of the group action may be determined by the server 300 (e.g., management software) or by a user input.

The controller 210 of each of the display apparatus 201, the lamp 205, and the DVD player 207 may receive a control command through the communicator 230. The controller 210 of each of the display apparatus 201, the lamp 205, and the DVD player 207 may store the received control command in the storage unit 275. The controller 210 of each of the display apparatus 201, the lamp 205, and the DVD player 207 may extract only a control command corresponding to each of the display apparatus 201, the lamp 205, and the DVD player 207 from the integrated control command corresponding to the received request of the external apparatus state information.

The controller 210 of each of the display apparatus 201, the lamp 205, and the DVD player 207 may determine a state of each of the display apparatus 201, the lamp 205, and the DVD player 207 in response to the received control command. For example, the controller 210 of the display apparatus 201 may determine that the display apparatus 201 is turned off. The controller 210 of the lamp 205 may determine that the lamp 205 is turned on. The controller 210 of the DVD player 207 may also determine that the DVD player 207 is turned off. The controller 210 of each of the display apparatus 201, the lamp 205, and the DVD player 207 may store determined external apparatus state information in the storage unit 275.

The controller 210 of each of the display apparatus 201, the lamp 205, and the DVD player 207 may transmit the external apparatus state information to the server 300. The controller 210 of each of the display apparatus 201, the lamp 205, and the DVD player 207 may periodically (e.g., every 500 msec that may be changed by settings) or aperiodically transmit the external apparatus state information to the server 300. Also, when a state of each of the display apparatus 201, the lamp 205, and the DVD player 207 is changed (e.g., when the DVD player 207 is turned on), the controller 210 of each of the display apparatus 201, the lamp 205, and the DVD player 207 may transmit changed external apparatus state information to the server 300.

The server 300 may receive the external apparatus state information from the display apparatus 201, the lamp 205, and the DVD player 207 through the communicator 330.

Table 2 shows external apparatus state information of the external apparatus 200 (e.g., the DVD player 207) included in the smart video watching 542b stored in the storage unit 375.

TABLE 2

| Variable | Example | Description |
| --- | --- | --- |
| Name | DVD Player | Resource name |
| URI | 192.168.0.2:1000/core/DVDP | Resource URI |
| State | Off | Resource State |

External apparatus state information may include a plurality of items indicating an external apparatus name, an external apparatus uniform resource identifier (URI), and an external apparatus state. It will be understood by one of ordinary skill in the art that the external apparatus state information is not limited to that described, and may include any items indicating various states of external apparatuses.

The controller 310 may also request one or more external apparatuses not included in the smart video watching 542b for external apparatus state information through the communicator 330. In doing so, it will be understood by one of ordinary skill in the art that the controller 310 may receive external apparatus state information from one or more external apparatuses not included in the smart video watching 542b through the communicator 330.

The controller 310 of the server 300 may determine states of the display apparatus 201, the lamp 205, and the DVD player 207 by using state information of the display apparatus 201, the lamp 205, and the DVD player 207 corresponding to the smart video watching 542b.

The controller 310 of the server 300 may generate action information (e.g., a control command corresponding to an action) corresponding to the smart video watching 542b.

The controller 310 of the server 300 may transmit the generated action information (e.g., the control command corresponding to the action) to the display apparatus 201, the lamp 205, and the DVD player 207 at operations 403 and 454.

The storage unit 375 may store the generated action information under the control of the controller 310. Table 3 shows a control command corresponding to action information of the DVD player 207 that is one of the display apparatus 201, the lamp 205, and the DVD player 207 included in the smart video watching 542b stored in the storage unit 375.

TABLE 3

| Variable | Example | Description |
| --- | --- | --- |
| Name | DVD Player | Resource name |
| URI | 192.168.0.2:1000/core/DVDP | Resource URI |
| State | On | Resource state |
| Start Time | PM 05:06:00 | Resource action start time |
| Duration | 2 Hours | Resource action duration |

External apparatus state information may include a plurality of items indicating an external apparatus name, an external apparatus URI, an external apparatus state, an external apparatus action start time, and an action duration. It will be understood by one of ordinary skill in the art that the external apparatus state information is not limited thereto and may include items indicating various states of external apparatuses.

The controller 210 of each of the display apparatus 201, the lamp 205, and the DVD player 207 may receive a control command corresponding to action information through the communicator 230. The controller 210 of each of the display apparatus 201, the lamp 205, and the DVD player 207 may store the received control command corresponding to the action information in the storage unit 275.

The controller 210 of each of the display apparatus 201, the lamp 205, and the DVD player 207 may execute (e.g., change states of) the display apparatus 201, the lamp 205, and the DVD player 207 in response to the received action information. For example, the controller 210 of the display apparatus 201 may turn on the display apparatus 201. The controller 210 of the lamp 205 may turn off the lamp 205. The controller 210 of the DVD player 207 may turn on the DVD player 207. The controller 210 of each of the display apparatus 201, the lamp 205, and the DVD player 207 may store changed external apparatus state information in the storage unit 275 in response to the action information.

The controller 210 of each of the display apparatus 201, the lamp 205, and the DVD player 207 may transmit the changed external apparatus state information to the server 300 in response to the action information. The controller 210 of each of the display apparatus 201, the lamp 205, and the DVD player 207 may periodically (e.g., every 500 msec that may be changed by settings) or aperiodically transmit the external apparatus state information to the server 300. Also, when a state of each of the display apparatus 201, the lamp 205, and the DVD player 207 is changed (e.g., when the DVD player 207 is temporarily stopped), the controller 210 of each of the display apparatus 201, the lamp 205, and the DVD player 207 may transmit the changed external apparatus state information to the server 300.

The server 300 may receive the external apparatus state information from each of the display apparatus 201, the lamp 205, and the DVD player 207.

Table 4 shows changed external apparatus state information received from the DVD player 207 from among the display apparatus 201, the lamp 205, and the DVD player 207 corresponding to the smart video watching 542b and stored in the storage unit 375 of the server 300.

TABLE 4

| Variable | Example | Description |
| --- | --- | --- |
| Name | DVD Player | Resource name |
| URI | 192.168.0.2:1000/core/DVDP | Resource URI |
| Present State | On | Resource State |
| Start Time | PM 05:06:00 | Resource action start time |
| Duration | 2 Hours | Resource action duration |
| Service Area | (On, Living room) | Resource working area |
| Service Characteristic | | |

External apparatus state information may include a plurality of items indicating an external apparatus name, an external apparatus URI, an external apparatus current state, an external apparatus action start time, and an action duration. It will be understood by one of ordinary skill in the art that the external apparatus state information is not limited to those described, and may include any items indicating various states of external apparatuses.

The storage unit 375 may store changed external apparatus state information in response to the received action information under the control of the controller 310 of the server 300.

The controller 310 of the server 300 may determine whether a conflict occurs between the smart video watching 542b that is being executed and another group action by using the changed external apparatus state information. The controller 310 of the server 300 may also determine whether a conflict occurs between the smart video watching 542b that is being executed and another group action by using the changed external apparatus state information that is periodically (e.g., every 500 msec that may be changed by settings) or aperiodically received.

In operation S302 of FIG. 3A, a request to execute a first group action is received from the first electronic apparatus 100.

When an input of a first user is received, the first electronic apparatus 100 may request the server 300 to execute the first group action. The server 300 may receive the execution request of the first group action from the first electronic apparatus 100.

Referring to FIGS. 4A, 4B, and 5A, the first user may execute the first group action in the first electronic apparatus 100 at operations 404, 452, and 455.

Referring to FIG. 5A, the first user may input a user input for setting and executing the first group action to the first electronic apparatus 100. The first user and the second user may be the same or different from each other.

Before the first user executes the first group action in the first electronic apparatus 100, execution of an application (e.g., an application for controlling an external apparatus in a home) of the first user is performed, in a manner substantially similar to execution of an application (e.g., an application for controlling an external apparatus in a home) of the second user in operation S301 of FIG. 3A and thus, a repeated explanation thereof will be omitted.

Referring to FIGS. 5C and 5D, in a manner similar to FIGS. 5A and 5B, the controller 110 of the first electronic apparatus 100 may display the application screen 500 corresponding to a touch (not shown). The displayed application screen 500 may include the application name area 510, the display area 520, and the interaction area 530. The application screen 500 displayed on the first electronic apparatus 100 is substantially the same as the application screen 500 displayed on the second electronic apparatus 101 and thus, a repeated explanation thereof will be omitted.

Referring to FIG. 5C, the group action list screen 540 is displayed on the display area 520.

The group action list screen 540 may display the display area name 541, one or more group actions 542 that may be selected by a user (e.g., the first user), and the selection box 543. The group action list screen 540 displayed on the first electronic apparatus 100 is substantially the same as the group action list screen 540 displayed on the second electronic apparatus 101 and thus, a repeated explanation thereof will be omitted.

The first user makes a third touch 503 on the cleaning home 542a that is one group action in the group action list 542. The first user may also make the third touch 503 on a selection box 543a corresponding to the cleaning home 542a on the group action list screen 540.

The controller 110 of the first electronic apparatus 100 may detect the third touch 503 by using the touchscreen 190 and the touchscreen controller 195. The controller 110 of the first electronic apparatus 100 may calculate a third touch position 503a (e.g., X3 and Y3 coordinates) corresponding to the third touch 503 by using an electrical signal received from the touchscreen controller 195.

The controller 110 of the first electronic apparatus 100 may store third touch position information corresponding to the third touch position 503a in the storage unit 175. The stored third touch position information may include a touch ID, touch position, touch detection time, or touch information (e.g., a touch pressure, touch direction, or touch duration) for history management.

The controller 110 of the first electronic apparatus 100 may display a check mark 543a1 on the selection box 543a in response to the third touch 503. The controller 110 of the first electronic apparatus 100 may also display a group action detail screen 550a in response to the third touch 503. The group action detail screen 550a is a detail screen of a group action corresponding to the cleaning home 542a.

Referring to FIG. 5D, the group action detail screen 550a is displayed on the display area 520.

The group action detail screen 550a may display the display area name 551, an ID (e.g., an icon) 552 corresponding to the external apparatus 200, and the state 553 of the external apparatus 200. The group action detail screen 550a may further include a selection box 554 that displays a selection of the first user. The group action detail screen 550a may also display a group action working area 555a indicating a working area of the group action or group action characteristics 556a corresponding to working characteristics of the group action.

The robot cleaner 552e, the air conditioner 552f, and the lamp 552c are selected on the group action detail screen 550a corresponding to the cleaning home 542a and thus, check marks 554e1, 554f1, and 554c1 are displayed on selection boxes 554e, 554f, and 554c.

Referring to FIG. 4B, a preset "home" is displayed on the group action working area 555a of the group action detail screen 550a at operation 452. Also, "noisy" is displayed on the group action characteristics 556a of the group action detail screen 550a. The first user may change selections of the selection boxes 554e, 554f, and 554c of the group action detail screen 550a.

The group action detail screen 550a displayed on the first electronic apparatus 100 is substantially similar to the application screen 500 displayed on the second electronic apparatus 101 (except for a group action difference) and thus, a repeated explanation thereof will be omitted.

The first user makes a fourth touch 504 on a button 531a corresponding to execution of the cleaning home 542a that is a selected group action.

The controller 110 of the first electronic apparatus 100 may detect the fourth touch 504 by using the touchscreen 190 and the touchscreen controller 195. The controller 110 of the first electronic apparatus 100 may calculate a fourth touch position 504a (e.g., X4 and Y4 coordinates) corresponding to the fourth touch 504 by using an electrical signal received from the touchscreen controller 195.

The controller 110 of the first electronic apparatus 100 may store fourth touch position information corresponding to the fourth touch position 504a in the storage unit 175. The stored fourth touch position information may include a touch ID, touch position, touch detection time, or touch information (e.g., a touch pressure, touch direction, or touch duration) for history management.

Referring to FIGS. 4A and 4B, the controller 110 of the first electronic apparatus 100 may request the server 300 to execute the cleaning home 542a that is a selected group action in response to the fourth touch 504.

The controller 110 of the first electronic apparatus 100 may directly request the external apparatus 200 corresponding to the cleaning home 542a to execute the cleaning home 542a.

When the fourth touch 504 is detected, the controller 110 may generate a control command (e.g., a control packet) for changing a state of the external apparatus 200 included in first group action information corresponding to the cleaning home 542a that is a first group action. The controller 110 of the first electronic apparatus 100 may transmit the generated control command to the server 300 through the communicator 130.

An execution request of the cleaning home 542a in the first electronic apparatus 100 in operation S302 of FIG. 3A is substantially similar to an execution request of the smart video watching 542b in the second electronic apparatus 101 in operation S301 of FIG. 3A (except for a group action difference) and thus, a repeated explanation thereof will be omitted.

For example, a control command corresponding to the cleaning home 542a may be substantially similar to a control command corresponding to the smart video watching 542b of Table 1 (except for a group action difference). External apparatus state information of external apparatuses, for example, the robot cleaner 202, the air conditioner 204, and the lamp 205, corresponding to the cleaning home 542a is substantially similar to external apparatus state information of the display apparatus 201, the lamp 205, and the DVD player 207 corresponding to the smart video watching 542b of Table 2 (except for a group action difference) and thus, a repeated explanation thereof will be omitted.

A control command corresponding to action information of the robot cleaner 202, the air conditioner 204, and the lamp 205 included in the cleaning home 542a is substantially similar to a control command corresponding to action information of the display apparatus 201 that is one of the display apparatus 201, the lamp 205, and the DVD player 207 included in the smart video watching 542b of Table 3 (except for a group action difference) and thus, a repeated explanation thereof will be omitted. Also, changed external apparatus state information corresponding to the action information of the robot cleaner 202, the air conditioner 204, and the lamp 205 included in the cleaning home 542a is substantially similar to changed external apparatus state information corresponding to the action information of the display apparatus 201 that is one of the display apparatus 201, the lamp 205, and the DVD player 207 included in the smart video watching 542b of Table 4 (except for a group action difference) and thus, a repeated explanation thereof will be omitted.

The storage unit 175 may store a control command corresponding to the cleaning home 542a, external apparatus state information of the robot cleaner 202, the air conditioner 204, and the lamp 205 corresponding to the cleaning home 542a, a control command corresponding to action information of the robot cleaner 202, the air conditioner 204, and the lamp 205 included in the cleaning home 542a, or changed external apparatus state information corresponding to action information of the robot cleaner 202, the air conditioner 204, and the lamp 205 included in the cleaning home 542a.

Operation S302 of FIG. 3A and operation S301 of FIG. 3A are substantially similar to each other (except for a difference in an electronic apparatus, a group action, and an external apparatus) and thus, a repeated explanation thereof will be omitted.

In operation S303 of FIG. 3A, the first group action that is requested to be executed is analyzed.

The controller 310 of the server 300 may receive a control command corresponding to the cleaning home 542a transmitted from the first electronic apparatus 100 through the communicator 330. The received control command may be stored in the storage unit 375 under the control of the controller 310.

Table 5 shows a control command corresponding to the cleaning home 542a transmitted from the first electronic apparatus 100 and stored in the storage unit 375 of the server 300.

TABLE 5

| Variable | Example | Description |
| --- | --- | --- |
| Name | Cleaning Home | Group action name |
| Owner | User 2 | Group action owner |
| User | User 1 | Group action executor |
| Start Time | PM 06:05:00 | Group action start time |
| End Time | PM 07:10:11 | Group action end time |
| Member | Vacuum, Air conditioner, Light | Group action resources member |
| Dominant Member | Vacuum | Group action dominant member |
| Action List | 3 | |
| Service Area | (On, Home) | Group action Resource working area (Semantic Location) |
| Service Characteristic | (On, Noise) (On, Brightness) | Group action Characteristic |

TABLE 5-continued

| Variable | Example | Description |
| --- | --- | --- |
| User Request | "No interrupt mode" | User input service mode. i.e., "No interrupt mode" → !MAKE_SOUND && !BRIGHTNESS |

Group action information may include a group action name, a name of a user who generates a group action, a name of a user who executes the group action, a group action start time, a group action end time, external apparatuses included in the group action, a dominant member of the group action that determines whether to execute a service of the group action, a group action list, the number of actions included in the group action, a service area where the group action is executed, characteristics of the group action, and a user request that is a service mode directly selected by the user to execute the group action. It will be understood by one of ordinary skill in the art that the group action information is not limited to those described, and may include any items indicating various states of external apparatuses.

The controller 310 may transmit a control command corresponding to a request of external apparatus state information to each of the robot cleaner 202, the air conditioner 204, and the lamp 205 corresponding to the cleaning home 542a by using the received control command and stored external apparatus information. The controller 310 may also transmit one integrated control command corresponding to the request of the external apparatus state information to each of the robot cleaner 202, the air conditioner 204, and the lamp 205.

The controller 210 of each of the robot cleaner 202, the air conditioner 204, and the lamp 205 may receive a control command through the communicator 230. The controller 210 of each of the robot cleaner 202, the air conditioner 204, and the lamp 205 may store the received control command in the storage unit 275. The controller 210 of each of the robot cleaner 202, the air conditioner 204, and the lamp 205 may extract only a control command corresponding to each of the robot cleaner 202, the air conditioner 204, and the lamp 205 from the integrated control command corresponding to the received request of the external apparatus state information.

The controller 210 of each of the robot cleaner 202, the air conditioner 204, and the lamp 205 may determine a state of each of the robot cleaner 202, the air conditioner 204, and the lamp 205 in response to the received control command. For example, the controller 210 of the robot cleaner 202 may determine that the robot cleaner 202 is turned off. The controller 210 of the air conditioner 204 may determine that the air conditioner 204 is turned off. Also, the controller 210 of the lamp 205 may determine that the lamp 205 is turned off. The controller 210 of each of the robot cleaner 202, the air conditioner 204, and the lamp 205 may store determined external apparatus state information in the storage unit 275.

The controller 210 of each of the robot cleaner 202, the air conditioner 204, and the lamp 205 may transmit changed external apparatus state information to the server 300.

The controller 210 of each of the robot cleaner 202, the air conditioner 204, and the lamp 205 may periodically (e.g., every 500 msec that may be changed by settings) or aperiodically transmit the changed external apparatus state information to the server 300. Also, when a state of each of the robot cleaner 202, the air conditioner 204, and the lamp 205 is stopped (e.g., when the robot cleaner 202 is temporarily stopped), the controller 210 of each of the robot cleaner 202, the air conditioner 204, and the lamp 205 may transmit the changed external apparatus state information to the server 300.

The server 300 may receive the changed external apparatus state information from each of the robot cleaner 202, the air conditioner 204, and the lamp 205 through the communicator 330.

Table 6 shows external apparatus state information of the external apparatus 200 (e.g., the lamp 205) included in the smart video watching 542*b* stored in the storage unit 375.

TABLE 6

| Variable | Example | Description |
|---|---|---|
| Name | Light | Resource name |
| URI | 192.168.0.2:1000/core/TV | Resource URI |
| State | Off | Resource State |

External apparatus state information may include a plurality of items indicating an external apparatus name, an external apparatus URI, and an external apparatus state. It will be understood by one of ordinary skill in the art that the external apparatus state information is not limited to those described, and may include any items indicating various states of external apparatuses.

The controller 310 of the server 300 may determine states of the robot cleaner 202, the air conditioner 204, and the lamp 205 by using state information of the robot cleaner 202, the air conditioner 204, and the lamp 205 corresponding to the cleaning home 542*a*.

In operation S304 of FIG. 3A, a presence of a group action conflict is determined.

Referring to FIG. 4A, the external apparatus 200 that is commonly included in the second group action and the first group action may be determined at operation 405. Also, referring to FIG. 4B, it may be determined that the second group action is being executed at operation 456.

The controller 310 of the server 300 may determine whether a group action conflict occurs by using external apparatus state information of the robot cleaner 202, the air conditioner 204, and the lamp 205 that execute the cleaning home 542*a* and a control command corresponding to the cleaning home 542*a*.

The controller 310 may determine whether a group action occurs by using a control command corresponding to the cleaning home 542*a* that is expected to be executed by the robot cleaner 202, the air conditioner 204, and the lamp 205, and a control command corresponding to the smart video watching 542*b* that is executed by the display apparatus 201, the lamp 205, and the DVD player 207. The controller 310 of the server 300 may also determine whether a group action conflict occurs by using a control command corresponding to the cleaning home 542*a*, external apparatus state information of the robot cleaner 202, the air conditioner 204, and the lamp 205 that execute the cleaning home 542*a*, a control command corresponding to the smart video watching 542*b* that is being executed, and external apparatus state information of the display apparatus 201, the lamp 205, and the DVD player 207 included in the smart video watching 542*b*.

The controller 310 of the server 300 may determine the external apparatus 200 that is commonly included in the smart video watching 542*b* that is being executed and the cleaning home 542*a* that is requested to be executed at operation 405. In an embodiment, the external apparatus 200 that is commonly included in the smart video watching 542*b* that is being executed and the cleaning home 542*a* that is requested to be executed may be the lamp 205.

The controller 310 of the server 300 may determine whether a group action conflict occurs by using the external apparatus 200 that is a common external apparatus. The controller 310 of the server 300 may determine whether there is a group action conflict of the lamp 205 that is a common external apparatus. For example, before a group action conflict is determined, the controller 310 of the server 300 may turn on the lamp 205, which was turned off due to execution of the smart video watching 542*b*, in response to execution of the cleaning home 542*a*.

Referring to FIG. 4A, the controller 310 of the server 300 may determine a dominant external apparatus of the smart video watching 542*b* at operation 406. In this case, the dominant external apparatus of the smart video watching 542*b* is the DVD player 207.

Referring to FIG. 4A, the controller 310 of the server 300 may request the DVD player 207, which is the dominant external apparatus of the smart video watching 542*b*, for group action state information at operation 407. Also, the controller 310 of the server 300 may use external apparatus state information (e.g., Table 2) of the DVD player 207 pre-stored in the storage unit 375 in response to execution of the smart video watching 542*b*.

Referring to FIG. 4A, the controller 210 of the DVD player 207 may transmit group action state information of the DVD player 207 to the server 300 through the communicator in response to a request of the server 300 at operation 408.

Referring to FIG. 4A, the controller 310 of the server 300 may determine execution of the smart video watching 542*b* by using one of external apparatus state information received from the DVD player 207 and external apparatus state information of the DVD player 207 pre-stored in the storage unit 375 in response to the execution of the smart video watching 542*b* at operation 409.

When a first group action and a second group action conflict with each other, the number of external apparatuses included in the first group action may be equal to or less than the number of external apparatuses included in the second group action. When a first group action and a second group action conflict with each other, the number of external apparatuses that are commonly included in the first group action and the second group action may be equal to or less than the number of all external apparatuses included in the first group action.

For example, when the number of external apparatuses included in a first group action is 3, the number of external apparatuses included in a second group action is 5, and the number of external apparatuses that are commonly included in the first group action and the second group action is 3, the number of the external apparatuses that are commonly included in the first group action and the second group action and the number of the external apparatuses included in the first group action are the same. Also, when the number of external apparatuses included in a first group action is 3, the number of external apparatuses included in a second group action is 5, and the number of external apparatuses that are commonly included in the first group action and the second group action is equal to or less than 2, the number of the external apparatuses that are commonly included in the first group action and the second group action may be less than the number of the external apparatuses included in the first group action.

Referring to FIG. 4A, when a first group action and a second group action conflict with each other, the controller 310 of the server 300 may reject an execution request of the cleaning home 542a at operation 410. The controller 310 of the server 300 may transmit execution request rejection information (not shown) corresponding to rejection of the execution request to the first electronic apparatus 100.

The storage unit 375 may store group action conflict information corresponding to a group action conflict under the control of the controller 310 of the server 300.

Table 7 shows group action conflict information stored in the storage unit 375 of the server 300.

TABLE 7

| Variable | Example | Description |
| --- | --- | --- |
| Name | Light | Group action conflict Resource name |
| Group action Name | Smart video watching, Cleaning home | Conflict group action name |
| URI | 192.168.0.2:1000/core/light | Resource URI |
| State | Off | Resource state |
| Time | PM 06:05:00 | Conflict estimated time |

Group action conflict information may include a plurality of items indicating an external apparatus name, an external apparatus URI, an external apparatus state, and a conflict estimated time. It will be understood by one of ordinary skill in the art that the group action conflict information is not limited to those described, and may include any items indicating various states of external apparatuses.

The controller 310 of the server 300 may determine whether a group action conflict occurs by using an area of the cleaning home 542a that is requested to be executed and an area of the smart video watching 542b that is being executed at operation 457. For example, the controller 310 of the server 300 may determine whether a group action conflict occurs by using an area (e.g., "living room") of the smart video watching 542b that is being executed and an area (e.g., "home") of the cleaning home 542a that is requested to be executed.

The controller 310 of the server 300 may determine whether a group action conflict occurs by using characteristics of the smart video watching 542b that is being executed and characteristics of the cleaning home 542a that is requested to be executed at operation 457. For example, the controller 310 of the server 300 may determine whether a group action conflict occurs by using characteristics (e.g., "silent and dim") of the smart video watching 542b that is being executed and characteristics (e.g., "noisy") of the cleaning home 542a that is requested to be executed.

When it is determined in operation S304 of FIG. 3A that a group action conflict occurs, the method proceeds to operation S305. When it is determined in operation S304 of FIG. 3A that a group action conflict does not occur, the method proceeds to operation S306. In operation S306 of FIG. 3A, the server 300 may enable the first group action to be executed by the robot cleaner 202, the air conditioner 204, and the lamp 205. Also, when it is determined in operation S304 of FIG. 3A that a group action conflict does not occur, the server 300 and the method of controlling the group action of the server 300 end.

In operation S305 of FIG. 3A, solution information corresponding to the group action conflict is transmitted to the first electronic apparatus 100.

Referring to FIG. 4B, the controller 310 of the server 300 may generate a recommended group action at operation 458.

The controller 310 of the server 300 may transmit a control command corresponding to generated group action solution information (e.g., the recommended group action) to the first electronic apparatus 100. The controller 310 of the server 300 may also transmit the control command corresponding to the generated group action conflict information to the second electronic apparatus 101.

The controller 310 of the server 300 may manage external apparatus state information, a group action, a group action list, determination of a group action conflict, group action conflict information, group action solution information, or group action conflict history by using management software (not shown).

The management software may use a cross-correlation algorithm or a K-means clustering algorithm for finding similarity between time series in order to analyze a group action and state information of the external apparatus 200. It will be understood by one of ordinary skill in the art that the present disclosure is not limited to those described, and various other algorithms for finding similarity may be used.

The management software may extract, learn, and determine characteristics from state information of the external apparatus 200 by using state information of the first electronic apparatus 100, the state information of the external apparatus 200, and group action information (e.g., information about whether there is the external apparatus 200 included in a plurality of group actions, a group action working area, or group action characteristics). The management software may determine whether a group action conflict occurs by extracting and learning characteristics of a group action by using state information of the external apparatus 200 or group action information (e.g., information about whether there is the external apparatus 200 included in a plurality of group actions, a group action working area, or group action characteristics).

The management software may also determine a group action solution to a group action conflict by extracting and learning characteristics of the group action conflict by using state information of the external apparatus 200 or group action information (e.g., information about whether there is the external apparatus 200 included in a plurality of group actions, a group action working area, or group action characteristics).

The storage unit 375 of the server 300 may store received external apparatus use history of a user corresponding to a state information change of the external apparatus 200 and received electronic apparatus use history of the user corresponding to a state information change of the first electronic apparatus 100 under the control of the controller 310. Each stored use history may be managed by the management software (not shown). The management software may extract and learn characteristics from the external apparatus use history and may determine whether there is a group action conflict and/or group action solution information corresponding to the group action conflict. Also, the management software may extract and learn characteristics from the electronic apparatus use history and may determine whether there is a group conflict and/or group action solution information corresponding to the group action conflict.

The management software may generate group action solution information corresponding to an analysis result of a group action conflict under the control of the controller 310. The management software may generate a separate recommended group action (e.g., cleaning home except living room) corresponding to group action solution information under the control of the controller 310. The management software may generate a separate recommended group action that may solve the group action conflict under the control of the controller 310.

The management software may generate the recommended group action (e.g., cleaning home except living room) corresponding to the group action solution information under the control of the controller 310 at operation 458. The management software may also generate one or more recommended group actions corresponding to the group action solution information under the control of the controller 310. The management software may check a state of the external apparatus 200 corresponding to the group action solution information.

The storage unit 375 may store one or more group action conflict solutions or recommended group actions corresponding to the group action conflict solutions under the control of the controller 310.

Referring to FIG. 4B, the controller 310 of the server 300 may transmit a control command corresponding to the generated group action solution to the first electronic apparatus 100 at operation 459.

The controller 110 of the first electronic apparatus 100 may receive a control command corresponding to group action conflict information through the communicator 130. The storage unit 175 may store a control command corresponding to the received group action conflict information under the control of the controller 110 of the first electronic apparatus 100.

Referring to FIG. 5E, the controller 110 of the first electronic apparatus 100 may display the group action conflict information received from the server 300. The controller 110 of the first electronic apparatus 100 may display the group action conflict screen 560 corresponding to the group action conflict information on the display area 520 of the application screen 500.

The group action conflict screen 560 may display a display area name 561 and detailed conflict information 562. The detailed conflict information 562 may display a group action conflict detail screen area 562a of a group action that is being executed or a group action conflict detail screen area 562b of a group action that is requested to be executed. Alternatively, the group action conflict detail screen area 562a and the group action conflict detail screen area 562b may be displayed as one screen area.

Information corresponding to a conflict between the cleaning home 542a that is requested to be executed and the smart video watching 542b that is being executed is displayed on the group action conflict screen 560. The group action conflict screen 560 may display that a group action conflict occurs due to the lamp 205 that is included in both the cleaning home 542a that is requested to be executed and the smart video watching 542b that is being executed.

The first user makes a fifth touch 505 on a solution 532 corresponding to the group action conflict.

The controller 110 of the first electronic apparatus 100 may detect the fifth touch 505 by using the touchscreen 190 and the touchscreen controller 195. The controller 110 of the first electronic apparatus 100 may calculate a fifth touch position 505a (e.g., X5 and Y5 coordinates) corresponding to the fifth touch 505 by using an electrical signal received from the touchscreen controller 195.

The controller 110 of the first electronic apparatus 100 may store fifth touch position information corresponding to the fifth touch position 505a in the storage unit 175. The stored fifth touch position information may include a touch ID, touch position, touch detection time, or touch information (e.g., a touch pressure, touch direction, or touch duration) for history management.

Referring to FIG. 5F, the controller 110 of the first electronic apparatus 100 may display the group action solution screen 570 on the display area 520 in response to the fifth touch 505. When only the group action solution screen 570 is displayed on the display area 520, the group action solution screen 570 may include a display area name (not shown) and a solution area. Alternatively, the controller 110 of the first electronic apparatus 100 may display the group action solution screen 570 and the group action conflict screen 560 on the display area 520 together in response to the fifth touch 505.

The first user may display a solution (e.g., cleaning except living room) corresponding to the group action conflict on the solution area of the group action solution screen 570.

A size of the group action solution screen 570 displayed on the display area 520 and a size of the group action conflict screen 560 may be the same or different from each other. When both the group action solution screen 570 and the group action conflict screen 560 are displayed, a size of the group action conflict screen 560 of FIG. 5F may be less than a size of the group action conflict screen 560 of FIG. 5E (e.g., a size of the group action conflict screen 560 of FIG. 5F may be less than 90% and greater than 10% of a size of the group action conflict screen 560 of FIG. 5E).

In another embodiment, referring to FIG. 5I, the controller 110 of the first electronic apparatus 100 may display the group action notification setting screen 590 for setting a notification on the display area 520 in response to the fifth touch 505. The group action notification setting screen 590 may include a display area name 591 and a notification setting detail area 592. The group action solution information may include a recommended group action or a notification setting.

A GUI for setting an alarm to ask the first user whether to execute the first group action may be displayed on the notification setting detail area 592, and the user may set a notification time and/or a notification condition through the displayed GUI. The first user may select at least one of the notification time and the notification condition on the notification setting detail area 592.

When the first user touches a return 593, the controller 110 of the first electronic apparatus 100 may display the group action conflict screen 560 of FIGS. 5H or 5F.

Referring to FIG. 5F, the first user makes a sixth touch 506 on the solution area of the group action solution screen 570.

The controller 110 of the first electronic apparatus 100 may detect the sixth touch 506 by using the touchscreen 190 and the touchscreen controller 195. The controller 110 of the first electronic apparatus 100 may calculate a sixth touch position 506a (e.g., X6 and Y6 coordinates) corresponding to the sixth touch 506 by using an electrical signal received from the touchscreen controller 195.

The controller 110 of the first electronic apparatus 100 may store sixth touch position information corresponding to the sixth touch position 506a in the storage unit 175. The stored sixth touch position information may include a touch ID, touch position, touch detection time, or touch information (e.g., a touch pressure, touch direction, or touch duration) for history management.

Referring to FIG. 5G, the controller 110 of the first electronic apparatus 100 may display the solution detail screen 580 on the display area 520 in response to the sixth touch 506.

The solution detail screen 580 may include a display area name 581 and a solution detail area 582. The solution detail area 582 may include a before area 582a corresponding to an area before a recommended solution is used and an after area 582b corresponding to an area after the recommended solution is used.

When the first user touches the after area 582*b*, the controller 110 of the first electronic apparatus 100 may provide other group action solution information.

When the first user touches a return 533, the controller 110 of the first electronic apparatus 100 may display the group action conflict screen 560 of FIGS. 5H or 5F.

Referring to FIG. 5H, the first user makes a seventh touch 507 on execute group action 534 on the group action conflict screen 560.

The controller 110 of the first electronic apparatus 100 may detect the seventh touch 507 by using the touchscreen 190 and the touchscreen controller 195. The controller 110 of the first electronic apparatus 100 may calculate a seventh touch position 507*a* (e.g., X7 and Y7 coordinates) corresponding to the seventh touch 507 by using an electrical signal received from the touchscreen controller 195.

The controller 110 of the first electronic apparatus 100 may store seventh touch position information corresponding to the seventh touch position 507*a* in the storage unit 175. The stored seventh touch position information may include a touch ID, touch position, touch detection time, or touch information (e.g., a touch pressure, touch direction, or touch duration) for history management.

The controller 110 of the first electronic apparatus 100 may generate a control command (e.g., a control packet) for changing states of the robot cleaner 202, the air conditioner 204, and the lamp 205 included in a recommended group action of the after area 582*b* in response to the seventh touch 507.

Referring to FIG. 4B, the controller 110 of the first electronic apparatus 100 may transmit the generated control command to the server 300 through the communicator 130 in response to the seventh touch 507 at operation 460. For example, a control command corresponding to the recommended group action of the after area 582*b* transmitted to the server 300 may be a control command obtained by changing a value corresponding to a service area in Table 1. The first group action selected by the first user may be changed in response to the transmitted control command.

The controller 310 of the server 300 may receive the control command corresponding to the recommended group action of the after area 582*b*. The received control command corresponding to the recommended group action of the after area 582*b* may be stored in the storage unit 375 under the control of the controller 310.

The controller 310 of the server 300 may transmit action information (e.g., a control command corresponding to an action) corresponding to the recommended group action of the after area 582*b* to the robot cleaner 202 corresponding to the recommended group action of the after area 582*b* at operation 461.

Transmission of a control command corresponding to the recommended group action of the first electronic apparatus 100 in operation S305 of FIG. 3A is substantially similar to transmission of a control command corresponding to an execution request of the second group action of the second electronic apparatus 101 in operation S301 of FIG. 3A and thus, a repeated explanation thereof will be omitted.

In operation S305 of FIG. 3A, when solution information corresponding to the group action conflict is transmitted to the first electronic apparatus 100, the method of controlling the group action of the server 300 ends.

Figure 3B:
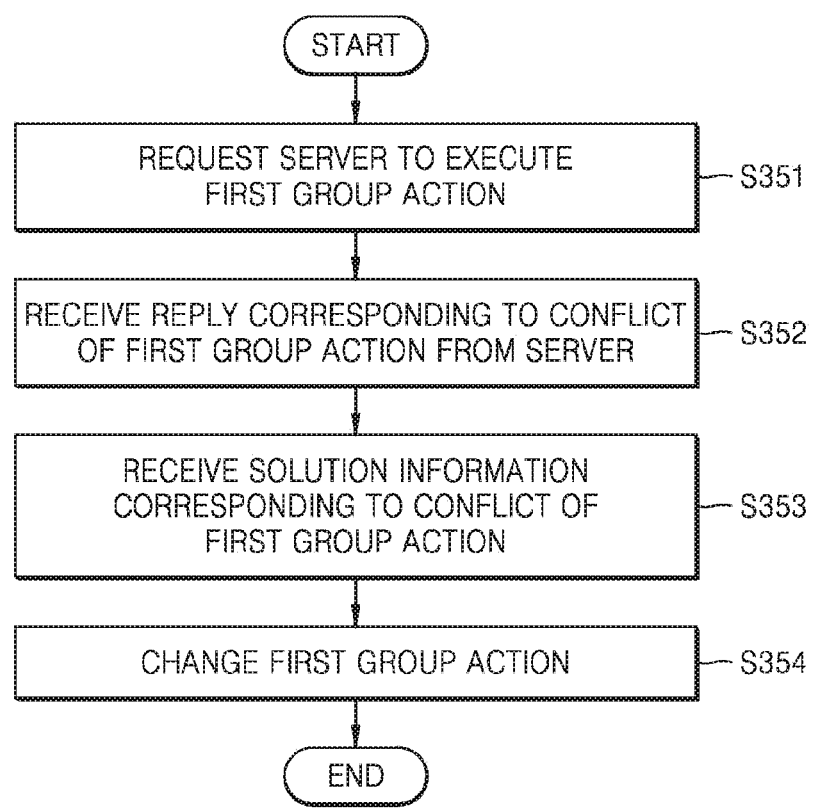
FIG. 3B is a flowchart of a method of controlling a group action of an electronic apparatus according to an embodiment of the present disclosure.

FIG. 3B is a flowchart of a method of controlling a group action of an electronic apparatus according to an embodiment of the present disclosure.

Referring to FIG. 3B, in operation S351, a request to execute the first group action is transmitted from the first electronic apparatus 100 to the server 300.

Referring to FIGS. 5C and 5D, the first user makes the fourth touch 504 corresponding to execution of the first group action. The controller 110 of the first electronic apparatus 100 may request the server 300 to execute the cleaning home 542*a* in response to the fourth touch 504. Operation S351 of FIG. 3B is substantially similar to operation S302 of FIG. 3A in that the first electronic apparatus 100 requests execution by the server 300 and thus, a repeated explanation thereof will be omitted.

In operation S352 of FIG. 3B, a reply corresponding to a first group action conflict is received from the server 300.

Referring to FIG. 5E, the controller 110 of the first electronic apparatus 100 may receive a reply (e.g., group action conflict information) corresponding to a group action conflict between the first group action and the second group action from the server 300. The controller 110 of the first electronic apparatus 100 may display the group action conflict screen 560 corresponding to the group action conflict on the application screen 500.

Reception of the reply corresponding to the first group action conflict from the server in operation S352 of FIG. 3B is substantially similar to reception of group action conflict information from the server 300 in operation S305 of FIG. 3A and thus, a repeated explanation thereof will be omitted.

In operation S353 of FIG. 3B, group action solution information corresponding to the first group action is received from the server 300.

Referring to FIG. 5F, the controller 110 of the first electronic apparatus 100 may receive group action solution information corresponding to the group action conflict from the server 300. The controller 110 of the first electronic apparatus 100 may display the group action solution screen 570 corresponding to the group action conflict on the application screen 500.

Reception of solution information corresponding to the first group action from the server 300 in operation S353 of FIG. 3B is substantially similar to reception of solution information corresponding to a group action conflict from the server 300 in operation S305 of FIG. 3A and thus, a repeated explanation thereof will be omitted.

In operation S354 of FIG. 3B, the first group action is changed.

Referring to FIG. 5H, the first user makes the seventh touch 507 on the execute group action 534 on the group action conflict screen 560. The controller 110 of the first electronic apparatus 100 may generate a control command (e.g., a control packet) for changing states of the robot cleaner 202, the air conditioner 204, and the lamp 205 included in the recommended group action of the after area 582*b* in response to the seventh touch 507.

A control command corresponding to a recommended group action of the after area 582*b* transmitted to the server 300 may be a control command obtained by changing a value corresponding to a service area in Table 1. When the recommended group action of the after area 582*b* is selected by the first user, the controller 110 of the first electronic apparatus 100 may change the first group action. When a control command corresponding to the recommended group action of the after area 582*b* is generated, the controller 110 of the first electronic apparatus 100 may change the first group action selected by the first user in response to the control command.

The controller 110 of the first electronic apparatus 100 may transmit the control command corresponding to the recommended group action of the after area 582b to the server 300 through the communicator 130.

Change of the first group action in operation S354 of FIG. 3B is substantially similar to change of the first group action in operation S305 of FIG. 3A and thus, a repeated explanation thereof will be omitted.

In operation S354 of FIG. 3B, when the first group action is changed, the method of controlling the group action of the electronic apparatus ends.

According to embodiments of the present disclosure, there may be provided a sensor that may determine whether a conflict occurs between a first group action that is being executed and a second group action that is requested to be executed through an external apparatus and a method of controlling a group action of the server.

According to embodiments of the present disclosure, there may be provided a server that may provide group action conflict information corresponding to a conflict between a first group action that is being executed and a second group action that is requested to be executed through an external apparatus and a method of controlling a group action of the server.

According to embodiments of the present disclosure, there may be provided a server that may provide group action solution information corresponding to a conflict between a first group action that is being executed and a second group action that is requested to be executed through an external apparatus and a method of controlling a group action of the server.

According to embodiments of the present disclosure, there may be provided a server that may provide a recommended group action corresponding to a conflict between a first group action that is being executed and a second group action that is requested to be executed through an external apparatus and a method of controlling a group action of the server.

According to embodiments of the present disclosure, there may be provided a server that may provide, to a user, group action conflict information corresponding to a conflict between a first group action that is requested by the user to be executed and another group action that is being executed and a method of controlling a group action of the server.

According to embodiments of the present disclosure, there may be provided a server that may provide, to a user, group action solution information corresponding to a conflict between a first group action that is requested by the user to be executed and another group action that is being executed and a method of controlling a group action of the server.

According to embodiments of the present disclosure, there may be provided a server that may provide, to a user, a recommended group action that is one solution corresponding to a conflict between a first group action that is requested by the user to be executed and another group action and a method of controlling a group action of the server.

According to various other embodiments of the present disclosure, there may be provided a server that may generate recommended group solution information corresponding to a conflict between a first group action that is being executed and a second group action that is requested to be executed and a method of controlling a group action of the server.

The methods according to various embodiments may be realized in a program command (or instruction) format that may be executed by using diverse computing means, so as to be recorded in a non-transitory, computer-readable medium. Herein, the computer-readable medium may independently include a program command (or instruction), data file, data structure, and so on, or may include a combination of the same. For example, the computer-readable medium may be stored in a volatile or nonvolatile storage device such as a ROM, a memory such as a RAM, a memory chip, or an integrated circuit, or a storage medium that may be optically or magnetically recorded and read by a machine (e.g., a computer) such as a compact disk (CD) a MD, a magnetic disk, or a magnetic tape, regardless of deletion possibility or re-recording possibility. It will be understood by one of ordinary skill in the art that a memory that may be included in a mobile terminal is a storage medium that may he read by a machine for storing programs or a program including instructions according to various embodiments. The program command recorded on the computer-readable medium may be specially designed and constructed for the present disclosure or may be known to and usable by one of ordinary skill in a field of computer software.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method of controlling a group action of a server, the method comprising:
    executing, as requested by a first electronic apparatus, a first group action that controls one or more appliances connected to the server;
    receiving, from a second electronic apparatus, an execution request of a second group action that controls one or more appliances connected to the server;
    requesting, in response to the received execution request of the second group action, state information of the one or more appliances corresponding to the first group action that is being executed;
    determining a group action conflict between the first group action that is being executed and the second group action that is requested to be executed, wherein the group action conflict is determined based on appliances that are included in the first group action and the second group action, and determined by using the state information and working areas of the one or more appliances corresponding to the second group action;
    generating group action solution information corresponding to the group action conflict between the first group action that is being executed and the second group action that is requested to be executed;
    transmitting the group action solution information to the second electronic apparatus; and
    generating a control command to execute the group action solution information that controls one or more appliances included in the first group action and the second group action,
    wherein the group action solution information is determined based on:
        the state information of the one or more appliances, and
        group action information including information about appliances related to both the first group action and the second group action, and at least one of first group action working areas of the first group action, second group action working areas of the second group action, first group action characteristics corresponding to the first group action, or second group action characteristics corresponding to the second group action, wherein the group action solution information includes changing a working area of at least one appliance corresponding to the first group action or the second group action, wherein a graphical user interface (GUI) of the second group action includes an object indicating whether the second group action is related to the group action conflict, and an identification of an appliance, among the one or more appliances corresponding to the second group action, related to the group action conflict, and wherein the group action solution information transmitted to the second electronic apparatus is used for changing the GUI of the second group action which is displayed on a screen of the second electronic apparatus.

2. The method of claim 1, wherein the group action solution information comprises any one of an alarm setting or a recommended group action corresponding to the group action conflict.

3. The method of claim 1, wherein the group action conflict is determined by using a first group action working area corresponding to the first group action and a second group action working area corresponding to the second group action.

4. The method of claim 1, wherein the group action conflict is determined by using the first group action characteristics corresponding to the first group action and the second group action characteristics corresponding to the second group action.

5. The method of claim 1, further comprising:
transmitting group action conflict information corresponding to the group action conflict to the first electronic apparatus,
wherein the group action conflict information comprises names of appliances corresponding to the group action conflict.

6. The method of claim 1, wherein the group action solution information comprises any one of one recommended group action or a plurality of recommended group actions.

7. The method of claim 1, wherein when the first group action and the second group action conflict with each other, a number of appliances that are included in the first group action and the second group action is equal to or less than a number of all of the one or more appliances included in the first group action.

8. A computer executable program code recorded on a computer readable non-transitory storage medium, wherein said computer executable program code when executed by a processor, configures the processor to perform the method as recited in claim 1.

9. A server for controlling a group action, comprising:
a transceiver configured to connect a first electronic apparatus, a second electronic apparatus, and appliances; and
at least one processor configured to:
execute a first group action requested from the first electronic apparatus through the transceiver that controls at least one of the appliances,
request, in response to a received execution request of a second group action, state information of appliances corresponding to the first group action that is being executed,
determine a group action conflict between the first group action that is being executed and the second group action that is requested to be executed,
wherein the group action conflict is determined based on appliances that are included in the first group action and the second group action, and
determined by using the state information and working areas of appliances corresponding to the second group action,
transmit, to the second electronic apparatus through the transceiver, group action solution information corresponding to the group action conflict determined in response to an execution request of the second group action received from the second electronic apparatus that controls at least one of the appliances, and
generate a control command to execute the group action solution information that controls one or more appliances included in the first group action and the second group action, wherein the group action solution information is determined based on:
the state information of the appliances, and
group action information including information about appliances related to both the first group action and the second group action, and at least one of first group action working areas of the first group action, second group action working areas of the second group action, first group action characteristics corresponding to the first group action, or second group action characteristics corresponding to the second group action, wherein the group action solution information includes changing a working area of at least one appliance corresponding to the first group action or the second group action, wherein a graphical user interface (GUI) of the second group action includes an object indicating whether the second group action is related to the group action conflict, and an identification of an appliance, among the appliances corresponding to the second group action, related to the group action conflict, and wherein the group action solution information transmitted to the second electronic apparatus is used for changing the GUI of the second group action which is displayed on a screen of the second electronic apparatus.

10. The server of claim 9, wherein the group action solution information comprises any one of an alarm setting or a recommended group action corresponding to the conflict of the second group action.

11. The server of claim 9, wherein the group action conflict is determined:
by using a first group action working area corresponding to the first group action and a second group action working area corresponding to the second group action, or
by using the first group action characteristics corresponding to the first group action and the second group action characteristics corresponding to the second group action.

12. The server of claim 9, wherein the at least one processor is further configured to receive requested appliance state information from the at least one of appliances included in the second group action through the transceiver.

13. A method of controlling a group action of an electronic apparatus, the method comprising:
executing an application that controls appliances in the electronic apparatus, the electronic apparatus being connectable to the appliances and a server;
requesting the server to execute a first group action that changes states of at least one appliance selected in a group action list;
receiving, from the server, group action conflict solution information corresponding to a conflict between the first group action and a second group action that is requested to be executed by another electronic apparatus, wherein the group action conflict is determined based on appliances that are included in the first group action and the second group action, and determined by using state information of appliances corresponding to the first group action that is being executed, and state information and working areas of appliances corresponding to the second group action; and displaying the received group action conflict solution information, wherein the group action conflict solution information is determined based on:

the state information of the one or more appliances, and group action information including information about appliances related to both the first group action and the second group action, and at least one of first group action working areas of the first group action, second group action working areas of the second group action, first group action characteristics corresponding to the first group action, or second group action characteristics corresponding to the second group action, wherein the group action conflict solution information includes changing a working area of at least one appliance corresponding to the first group action or the second group action, wherein a graphical user interface (GUI) of the second group action includes an object indicating whether the second group action is related to the group action conflict, and an identification of an appliance, among appliances corresponding to the second group action, related to the group action conflict, and wherein the group action conflict solution information transmitted to the second electronic apparatus is used for changing the GUI of the second group action which is displayed on a screen of the second electronic apparatus.

14. The method of claim 13, wherein the group action conflict solution information comprises any one of an alarm setting or a recommended group action corresponding to a conflict of the second group action.

15. The method of claim 13, wherein names of appliances that are included in the first group action and the second group action are included in the group action conflict solution information.

16. The method of claim 13, further comprising displaying group action conflict information corresponding to a conflict of the first group action received from the server.

17. A computer executable program code recorded on a computer readable non-transitory storage medium, wherein said computer executable program code when executed by a processor, configures the processor to perform the method as recited in claim 13.

* * * * *